United States Patent
Lalonde

(10) Patent No.: US 10,640,683 B2
(45) Date of Patent: May 5, 2020

(54) POSTAL SEALING SYSTEMS AND METHODS

(71) Applicant: Kamz Technologies Company LLC, Bedford, NH (US)

(72) Inventor: Mark Lalonde, Bedford, NH (US)

(73) Assignee: KAMZ TECHNOLOGIES COMPANY LLC, Walpole, NH (US)

( * ) Notice: Subject to any disclaimer, the term of this patent is extended or adjusted under 35 U.S.C. 154(b) by 1013 days.

(21) Appl. No.: 14/535,840

(22) Filed: Nov. 7, 2014

(65) Prior Publication Data

US 2015/0218421 A1    Aug. 6, 2015

Related U.S. Application Data

(63) Continuation-in-part of application No. 29/484,463, filed on Mar. 10, 2014, now Pat. No. Des. 771,185.

(60) Provisional application No. 61/936,588, filed on Feb. 6, 2014.

(51) Int. Cl.
| | |
|---|---|
| *B32B 3/02* | (2006.01) |
| *C09J 7/02* | (2006.01) |
| *G09F 3/03* | (2006.01) |
| *C09J 7/22* | (2018.01) |

(52) U.S. Cl.
CPC .............. *C09J 7/0264* (2013.01); *C09J 7/22* (2018.01); *G09F 3/0341* (2013.01); *C09J 2201/122* (2013.01); *C09J 2201/16* (2013.01); *Y10T 428/219* (2015.01); *Y10T 428/24488* (2015.01); *Y10T 428/24777* (2015.01)

(58) Field of Classification Search
CPC .......................... C09J 7/0264; C09J 2201/122; C09J 2201/16; G09F 3/0341; Y10T 428/219; Y10T 428/24488; Y10T 428/24777
See application file for complete search history.

(56) References Cited

U.S. PATENT DOCUMENTS

| | | | | |
|---|---|---|---|---|
| 385,158 | A * | 6/1888 | Woodhull | B42D 15/025 283/101 |
| 4,547,001 | A * | 10/1985 | Stitt | G09F 3/02 283/101 |
| 4,587,146 | A * | 5/1986 | Anhauser | A61F 13/023 428/42.2 |
| 4,787,158 | A * | 11/1988 | Vitol | G09F 3/02 156/289 |
| 5,634,670 | A * | 6/1997 | Orensteen | G09F 3/20 283/101 |

(Continued)

OTHER PUBLICATIONS

Dictionary.com definition of "Flaw".*
(Continued)

*Primary Examiner* — Travis M Figg

(74) *Attorney, Agent, or Firm* — Grossman Tucker; Perreault & Pfleger PLLC

(57) ABSTRACT

A tab for sealing an unenveloped mailpiece having a front surface, a rear surface, and at least one unbounded edge separating the front and rear surfaces. The tab includes a flexible film configured to extend from the front surface across the unbounded edge to the rear surface. The flexible film has a periphery region and a substantially continuous inner region. At least one adhesive layer is disposed about at least a portion of a bottom surface of the flexible film configured to adhere to the front and the rear surfaces of the mailpiece. At least one peripheral flaw is disposed within the periphery region and generally aligned with unbounded edge.

18 Claims, 26 Drawing Sheets

(56) References Cited

U.S. PATENT DOCUMENTS

| | | | | |
|---|---|---|---|---|
| 5,902,439 | A * | 5/1999 | Pike | G09F 3/02 156/252 |
| 6,139,067 | A * | 10/2000 | Roussey | G09F 3/00 229/70 |
| 6,458,440 | B1 * | 10/2002 | Merritt | B65D 57/00 206/448 |
| 6,676,164 | B1 * | 1/2004 | Patton | B42D 15/027 283/101 |
| 7,909,363 | B2 * | 3/2011 | Anderson | G09F 3/0288 283/100 |
| 8,312,655 | B2 * | 11/2012 | Liu | G09F 3/0292 283/101 |
| 2002/0024214 | A1 * | 2/2002 | Wagner | G09F 3/00 283/71 |
| 2002/0033598 | A1 * | 3/2002 | Beasley | G09F 3/00 283/71 |
| 2010/0025476 | A1 * | 2/2010 | Widzinski, Jr. | G09F 3/0294 235/488 |
| 2011/0126439 | A1 * | 6/2011 | Liu | G09F 3/0292 40/638 |
| 2011/0244162 | A1 * | 10/2011 | Honda | G09F 3/0292 428/42.2 |
| 2012/0029125 | A1 * | 2/2012 | Gallucci | C08G 73/1046 524/153 |
| 2015/0218421 | A1 * | 8/2015 | Lalonde | C09J 7/0264 428/66.7 |

OTHER PUBLICATIONS

Dictionary.com definition of "Periphery".*
Definition of Parallel (accessed at http://www.dictionary.com/browse/parallel on Apr. 13, 2018).*
NPL submission of Feb. 28, 2018.

* cited by examiner

POSTAL SEALING SYSTEMS AND METHODS

CROSS-REFERENCE TO RELATED APPLICATIONS

The present application claims the benefit of U.S. Provisional Patent Application No. 61/936,588, filed on Feb. 6, 2014 and is a continuation-in-part of U.S. Design patent application Ser. No. 29/484,463, filed on Mar. 10, 2014, both fully incorporated by reference herein.

FIELD

This disclosure relates to postal sealing systems and methods, and, more particularly, to systems and methods for sealing and easily opening tabs for postal articles.

BACKGROUND

The United States Postal Service (USPS) publishes and maintains physical standards for articles to be sent through the mail. These standards describe the criteria used by the USPS to determine if letters, cards, and unenveloped mailpieces fit within the qualifications of "machinable", "nonmachinable", or "automation" classes of mail. Unenveloped mailpieces (such as, but not limited to, booklets, folded self mailers, or double postcards) are also subject to additional requirements related to the preferred method for sealing, or tabbing. Tabbing involves folding an adhesive backed film over any unbound edges to keep them secure. Failure to conform to these requirements can incur additional cost to the sender, delay delivery, or damage and jam high-speed mail processing equipment. In direct mailing and advertising applications, tabbing to ensure compliance with USPS machinable and automation requirements is crucial to reducing costs, and eliminates the need for an envelope.

One type of tab used with unenveloped mailpieces includes paper tabs. While paper tabs are easy to open, they are opaque. As a result, even the most translucent paper seals are disruptive to the appearance, content, and style of unenveloped mailpieces.

Another type of tab used with unenveloped mailpieces includes solid and perforated transparent polymer tabs. While solid and perforated transparent polymer tabs do not visually interfere with graphics and print material underneath, they suffer from several disadvantages. For example, the toughness of the solid polymer tabs prevent the seals from being easily torn or broken by the user, especially for the elderly. Because of the difficulty in breaking the solid polymer tabs, many recipients open the unenveloped mailpieces by tearing the paper around the solid polymer tab, thereby damaging the document and creating an unpleasant visual appearance.

While perforated polymer tabs allow recipients to open their mail by breaking the seal along the perforation, perforated polymer tabs proved to be problematic for the USPS, as they were prone to opening during the mailing process, jamming handling and sorting equipment. For this reason, the USPS now requires all tabbing to be done with nonperforated seals. See, USPS Quick Service Guide 20 lb. See, Mailing Standards of the United States Postal Service Domestic Mail Manual section 201.3.

Accordingly, there is a need for a tab that offers transparency, adequate adhesion, and ease of opening, while maintaining the required standards of the USPS, and not significantly increasing the cost of sealing unenveloped mail. Such a seal would also need to be compatible with current automatic tabber equipment.

BRIEF DESCRIPTION OF THE DRAWINGS

Features and advantages of the present invention are set forth by description of embodiments consistent with the present invention, which description should be considered in conjunction with the accompanying drawings wherein.

DETAILED DESCRIPTION

By way of summary, one embodiment of the present disclosure may feature an easy to open mailing tab or wafer seal that meets USPS physical standards for machinable and automation letters and cards. The tabs may include a polymer substrate made of any flexible material, including but not limited to transparent polymeric materials such as polyethylene terephthalate, polypropylene, polystyrene, polyethylene, polyester, and triacetate. The polymer substrate of the tab provides the strength necessary for sealing the mailpieces or packages. The polymer substrate may be coated with an adhesive layer appropriate for adhering to paper or cardstock, including but not limited to pressure-sensitive adhesives such as acrylics, polyesters, and natural rubber. The coated films, backed with release liner, can be die-cut to shape, incorporating structural, peripheral flaws to act as areas of stress concentration, providing a geometry that will aid in the breaking or opening the tab. The stress concentrations created by the peripheral flaws increase the ease of opening, relative to solid tabs, by reducing the tear strength. These flaws can be designed to allow the tab to be suitably tough during mailing or shipping, but easily opened when a finger or object is inserted between the sealed surfaces. When rolls of these die-cut coated films are produced, they may be completely compatible with typical tabbing machinery.

A tab consistent with at least one embodiment of present disclosure provides the necessary adhesion force, strength and toughness required to sealing postal articles or packages while also complying with the USPS specification of non-perforation. A tab consistent with at least one embodiment of the present disclosure is easy to open without damaging the underlying article. A tab, consistent with at least one embodiment of the present disclosure, may be substantially transparent and therefore can maintain the visual aesthetics of the article it is sealing.

Accordingly, the shortcomings of traditional solid polymer and paper tabs and wafer seals may be overcome by at least one embodiment of the tabs consistent with the present disclosure. The tabs of the present disclosure may be easily and inexpensively manufactured (e.g., using die-cutters or the like) and may be applied to mailpieces using current tabbing equipment, with little or no modification. The tabs of the present disclosure could be used to seal any mailpiece that needs to meet USPS physical standards for machinable or automation letters and cards, or any packaging where a strong, but easily opened seal is desirable. The present disclosure may also be applied to transparent seals.

Figure 1:
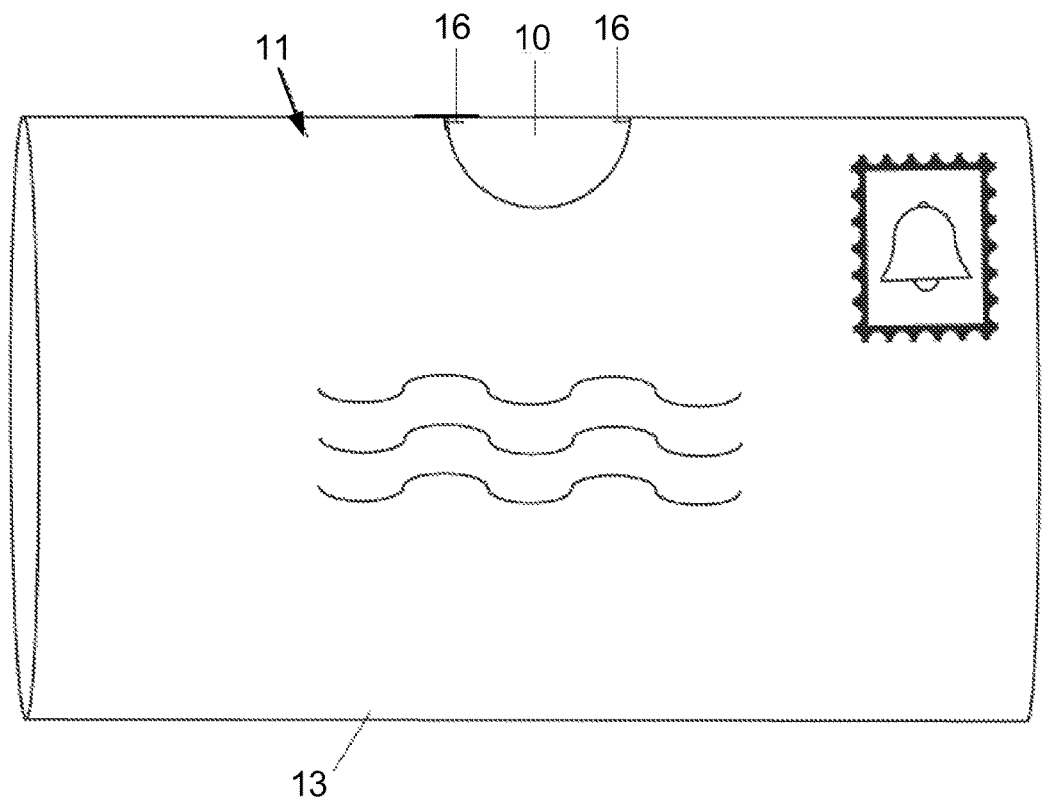
FIG. 1 is a side view of a tab adhered to an unbounded edge region of an unenveloped mailpiece consistent with at least one embodiment of the present disclosure.

With reference to FIG. 1, a tab 10 adhered to an unbounded edge region 11 of an unenveloped mailpiece 13 consistent with at least one embodiment of the present disclosure is generally illustrated. The tab 10 is folded over at least a portion of the unbounded edge region 11 of an unenveloped mailpiece 13 to keep the unbounded edge region 11 secure during processing of the unenveloped mailpiece 13. As used herein, the term "unenveloped mailpiece" means any mailpiece which requires a tab for sealing an unbounded edge as required by the USPS.

Figure 2:
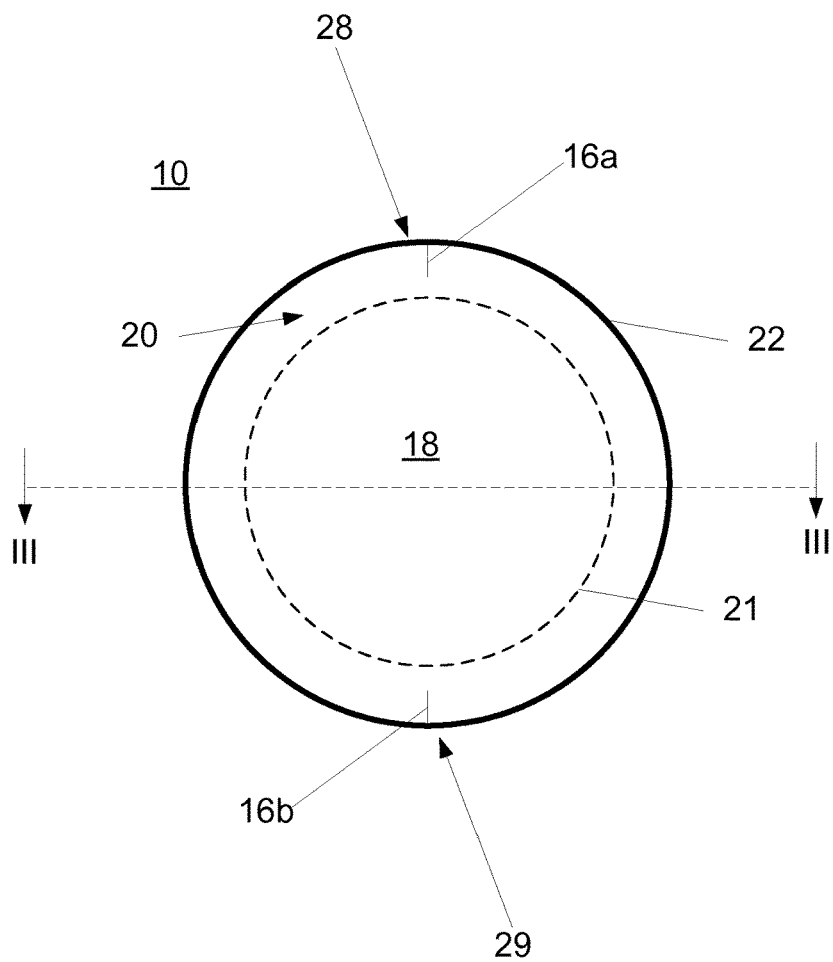
FIG. 2 is a top plan view of a first embodiment of a tab consistent with the present disclosure.
Figure 3:
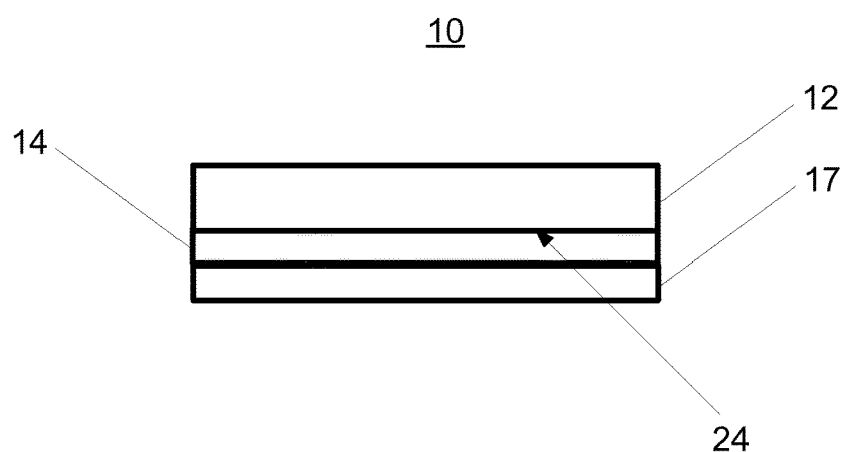
FIG. 3 is a cross-sectional view of the tab of FIG. 2 taken along lines III-III consistent with the present disclosure.

Turning now to FIGS. 2 and 3, a top plan view and a cross-sectional view taken along line III-III of FIG. 2 of a tab 10 consistent with one embodiment of the present disclosure is generally illustrated. The tab 10 may include a polymer substrate 12, at least one layer of an adhesive 14, and one or more peripheral flaws 16 configured to allow the tab 10 to be easily and/or evenly broken into two pieces. Optionally, the tab 10 may include a release layer 17 configured to prevent the adhesive layer 14 from accidentally adhering to a surface until the tab 10 is ready for use. The release layer 17 may be generally coextensive with the adhesive layer 14 and may include, for example, waxed paper, silicon release sheet, or the like.

The polymer substrate 12 may include any polymer material having sufficient toughness to prevent accidental opening of the unenveloped mailpieces 13, yet flexible enough to bend around the unbounded edges of unenveloped mailpieces 13. The polymer substrate 12 may also include transparent or opaque polymers. For example, the polymer substrate 12 may include, but is not limited to, transparent polymeric materials such as polyethylene terephthalate, polypropylene, polystyrene, polyethylene, polyester, and triacetate. As may be appreciated, transparent tabs may, in general, be preferable to opaque polymers since they will not alter the appearance of the unenveloped mailpieces 13, however, tabs 10 consistent with the present disclosure are not limited to transparent polymers unless specifically claimed as such. It should also be appreciated that the polymer substrate 12 may include a plurality of different layers. For example, the polymer substrate 12 may include a one or more layers providing a high degree of strength and one or more layers that bond well with the adhesive layer(s) 14. One or more of the layers may be coextensive with other layers and/or may extend across only a portion of the polymer substrate.

The polymer substrate 12 may also have any shape provided that the tab 10 is able to extend across the unbounded edge region 11 of the unenveloped mailpiece 13. For example, the polymer substrate 12 may have generally circular shape, a generally oval shape, a generally rectangular shape, or the like. The thickness, length, and width of the polymer substrate 12 will depend on the intended application, for example, the necessary strength, flexibility, adhesion, and/or dimensions of the mailpiece 13. For example, the polymer substrate 12 may be die-cut from 1.5 or 2 mil polypropylene or polystyrene film.

Alternatively, the polymer substrate 12 may also have a non-circular shape, provided that the tab 10 is able to extend across the unbounded edge region 11 of the unenveloped mailpiece 13. For example, the polymer substrate 12 may have a generally, square or rectangular shape, a generally star shape, a generally triangular shape, or any other shape of any arbitrary or specific number of sides or configurations, so long as the tab 10 is able to extend across the unbounded edge region 11 of the unenveloped mailpiece 13, as discussed herein.

The polymer substrate 12 may include an inner region 18 and a periphery region 20. As used herein, the periphery region 20 is defined as a portion of the polymer substrate 12 extending from the periphery/peripheral edge 22 to not more than 10% of the longest cross-sectional dimension of the polymer substrate 12. For example, the periphery region 20 may include a portion of the polymer substrate 12 extending from the periphery/peripheral edge 22 to not more than 5% of the longest cross-sectional dimension, and/or not more than 1% of the longest cross-sectional dimension. The remaining portion of the polymer substrate 12 is defined as the inner region 18. The transition between the inner region 18 and the periphery region 20 is generally indicated by dotted line 21 in FIG. 2.

The adhesive layer 14 may include any adhesive material appropriate for adhering the polymer substrate 12 to paper or cardstock. For example, the adhesive layer 14 may include, but is not limited to, pressure-sensitive adhesives such as acrylics, polyesters, and natural rubber. The adhesive layer 14 is may be opaque or transparent. According to one embodiment, the adhesive layer 14 may be generally coextensive with a bottom surface 24 of the polymer substrate 12. Alternative (or in addition), the adhesive layer 14 may be formed at a plurality of discrete (e.g., separate, non-overlapping/contacting) regions of the bottom surface 24 of the polymer substrate 12. According to one embodiment, the tab 10 may include a polypropylene or polystyrene polymer substrate 12 film backed with general purpose permanent acrylic adhesive. As it may be appreciated, the adhesive 14 and the release layer 17 may be of the same shape as the polymer substrate 12, as described herein.

As discussed above, the tabs 10 include one or more peripheral flaws 16 configured to allow the tab 10 to be easily and/or evenly broken into two pieces. Whereas a perforation extends across an entire cross-section of a tab, the peripheral flaws 16 according to the present disclosure are located anywhere in the peripheral region 20 of the cross-section of the tab 10 and not across the inner region 18 of the polymer substrate 12. As such, the inner region 18 of the polymer substrate 12 is substantially continuous and does not include any perforations, flaws, and/or defects that extend across the inner region 18 of the polymer substrate 12. By introducing specifically sized and/or shaped flaws or weaknesses (e.g., areas of stress concentration) into the polymer substrate 12, the peripheral flaws 16 allow the force at which the tab 10 tears to be designed into the structure, as well as the holding force of the adhesive tab 10.

For example, the tab 10 may include one or more peripheral flaws 16 that extend from a peripheral edge 22 of the polymer substrate 12 across only the peripheral region 20 of the cross-section of the tab 10 and not across the inner region 18 of the polymer substrate 12. Alternatively (or in addition), the tab 10 may include one or more peripheral flaws 16 located in the peripheral region 20 that are offset from the peripheral edge 22, but remains substantially within the periphery/peripheral region 20. The one or more peripheral flaws 16 may be located anywhere within the peripheral/periphery region 20, so long as the tab 10 is not considered to be perforated throughout the inner region 18 of the tab 10.

The peripheral flaw 16 may extend all the way through the thickness of the polymer substrate 12 and/or across only a portion of the thickness of the adhesive 14.

In use, the tabs 10 are folded over the unbound edge regions 11 of the mailpiece 13 and secured to the mailpiece 13 by the adhesive layer 14. According to one embodiment, the peripheral flaws 16 may be generally aligned with the unbound edge regions 11 when the tab 10 is folded over the unbounded edge region 11 of the unenveloped mailpieces 13 such that the folded tab 10 is torn in a directly generally parallel to the unbounded edge region 11. In the illustrated embodiment, tabs 10 are shown on the unbounded edge region 11 opposite the fold of the unenveloped mailpiece 13, though it should be appreciated that this is merely illustrative and that the tabs 10 may be placed anywhere along the unbounded edge regions 11 of the unenveloped mailpiece 13. USPS regulations govern the size, location, and number of tabs necessary for various classifications of mail.

The size and/or shape of the areas of the peripheral flaws 16 can be determined for specific tabbing operations to strike a balance between maximum sealing force and ease of opening. A material's inherent resistance to fracture, known as fracture toughness, can be quantified by the variable $K_{IC}$, the critical stress intensity factor. $K_{IC}$ values are known for most materials, and can be found in various tables and handbooks. When $K_{IC}$ is known, the stress at which the material, polymer, or tab will fail ($\sigma_f$) or tear due to flaws is equal to:

$$\sigma_1 = K_{IC}/\sqrt{(\pi a)}$$

where a is the length of the peripheral flaw 16 in the edge 22 of the polymer substrate 12. Once the stress a tab 10 is subjected to exceeds the calculated $\sigma_f$, a crack 26 is initiated at the peripheral flaw 16 and propagates through the polymer substrate 12 and the tab 10 is opened. This equation also explains why perforated tabs perform so poorly and are banned by the USPS: perforations essentially behave as very large interrupted cracks. The aforementioned equation shows that as the length of a flaw a increases, the stress or force at which the tab breaks decreases.

The number, size, shaped, and/or arrangement of the peripheral flaws 16 may therefore vary depending on the intended application. For example, the peripheral flaws 16 may have almost any geometry including, but not limited to, v-shaped notches (e.g., in which the tip of the V is facing either towards and/or away from the center point of the polymer substrate 12), sawtooth patterns, starburst patterns, waves, arcs, slits, or a designed reduction in thickness of the polymer substrate 12. According to one embodiment, the tab 10 may include a 1.5 to 2 mil polypropylene or polystyrene polymer substrate 12 having one or more peripheral flaws 16 with a length of approximately 1/64 to 1/8 of an inch, for example, 1/64 to 1/16 of an inch, 1/32 to 1/16 of an inch, and/or 1/16 to 1/8 of an inch. Peripheral flaws 16 having lengths in this range have been found to provide a good balance of sealing strength and ease of opening, though it should be appreciated that the length of the peripheral flaws 16 is not limited to this range unless specifically claimed as such.

Figure 4:
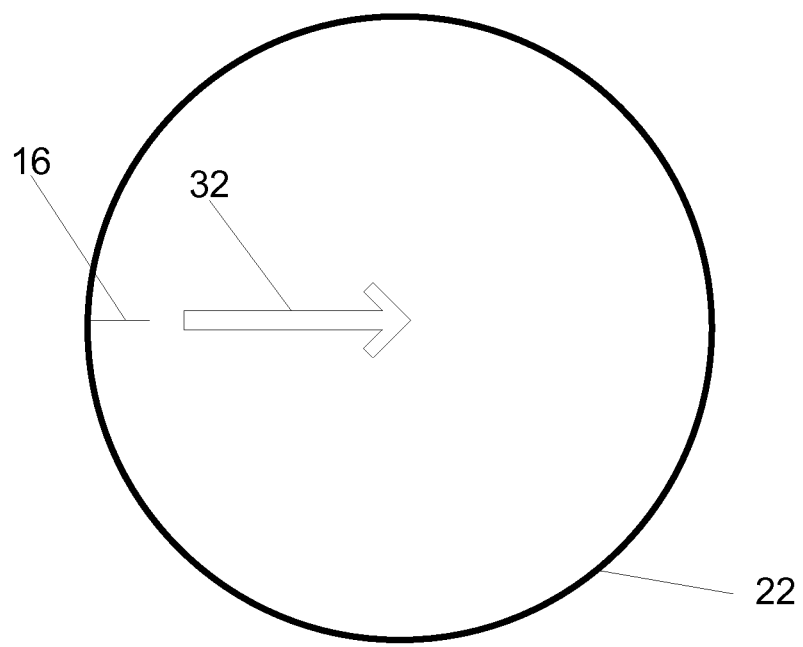
FIG. 4 is a top plan view of a second embodiment of a tab consistent with the present disclosure.

Referring still to FIG. 2, a tab 10 is generally illustrated having opposing peripheral flaw 16a, 16b. The opposing peripheral flaws 16a, 16b allows for the opening of the tab 10 from either side 28, 29 of the tab 10. Turning now to FIG. 4, the tab 10b may include a single flaw 16. The single peripheral flaw 16 may have a length of approximately 1/32" to 1/16". Such an embodiment would only be able to be easily opened from the location of the single peripheral flaw 16; opening at any other location along the circumference of the tab would be much more difficult. The tab 10 may optionally include one or more indicia 32 which indicate the direction that the tab 10 should be torn and/or the location of the peripheral flaw 16. The indicia 32 may include, for example, an arrow or the like. The indicia 32 may be visible only in the region of the fold of the tab 10b such that the indicia 32 does not obscure the appearance, content, and style of the unenveloped mailpiece 13.

Figure 5:
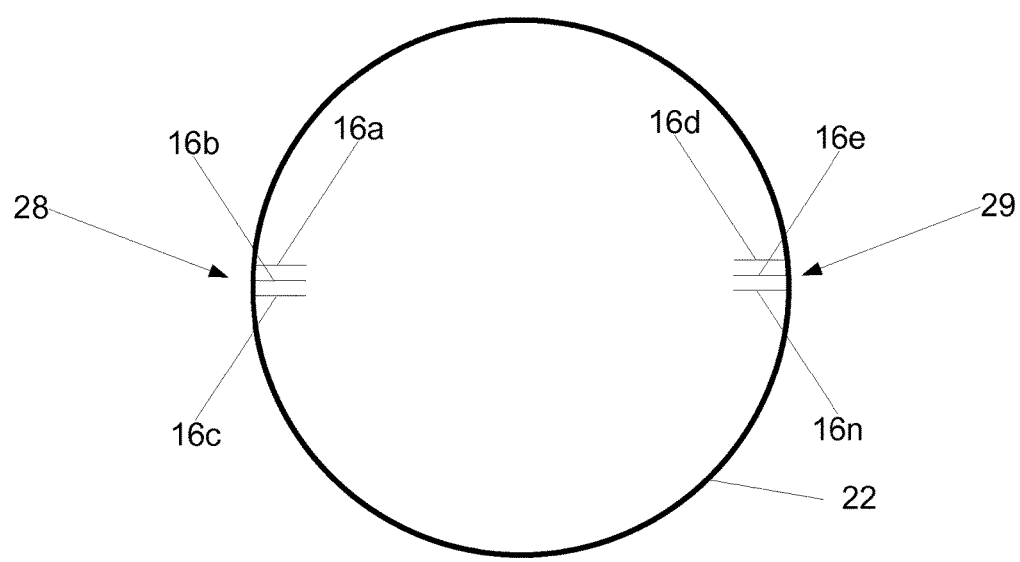
FIG. 5 is a top plan view of a third embodiment of a tab consistent with the present disclosure.

With reference to FIG. 5, yet another embodiment of a tab 10c consistent with the present disclosure is generally illustrated. The tab 10c includes a plurality of peripheral flaws 16a-16n extending from one or more opposed sides/portions 28, 29 of the tab 10c (e.g., when the tab 10c is folded as general illustrated in FIG. 1). The plurality of peripheral flaws 16a-16n does not require as accurate a placement of the tab 10c as it is folded over an unbound edge region 11 of the unenveloped mailpiece 13, thereby making the tab 10c more compatible in automated tabbing machinery compared to the a single peripheral flaw or pair of peripheral flaws. The plurality of peripheral flaws 16a-16n may be matched (e.g., location, and spacing of the plurality of peripheral flaws 16a-16n may extend generally in a one-to-one correlation cross lines of the polymer substrate 12) or unmatched. According to one embodiment, the tab 10c may include up to ten peripheral flaws 16a16n on one or more of the sides 28, 29.

Figure 6A:
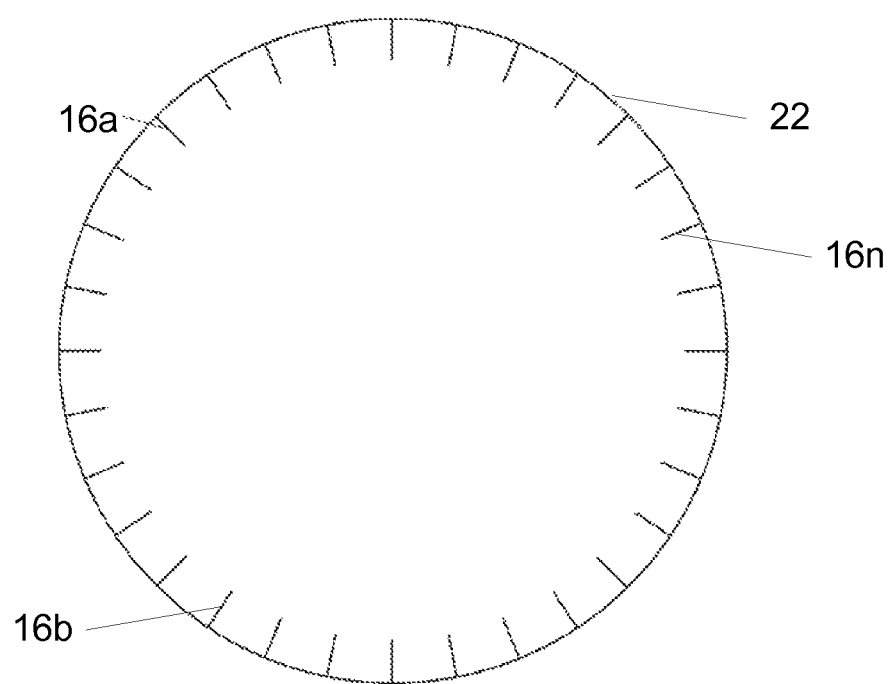
FIGS. 6a and 6b are top plan views of a further embodiment of a tab consistent with the present disclosure.
Figure 6B:
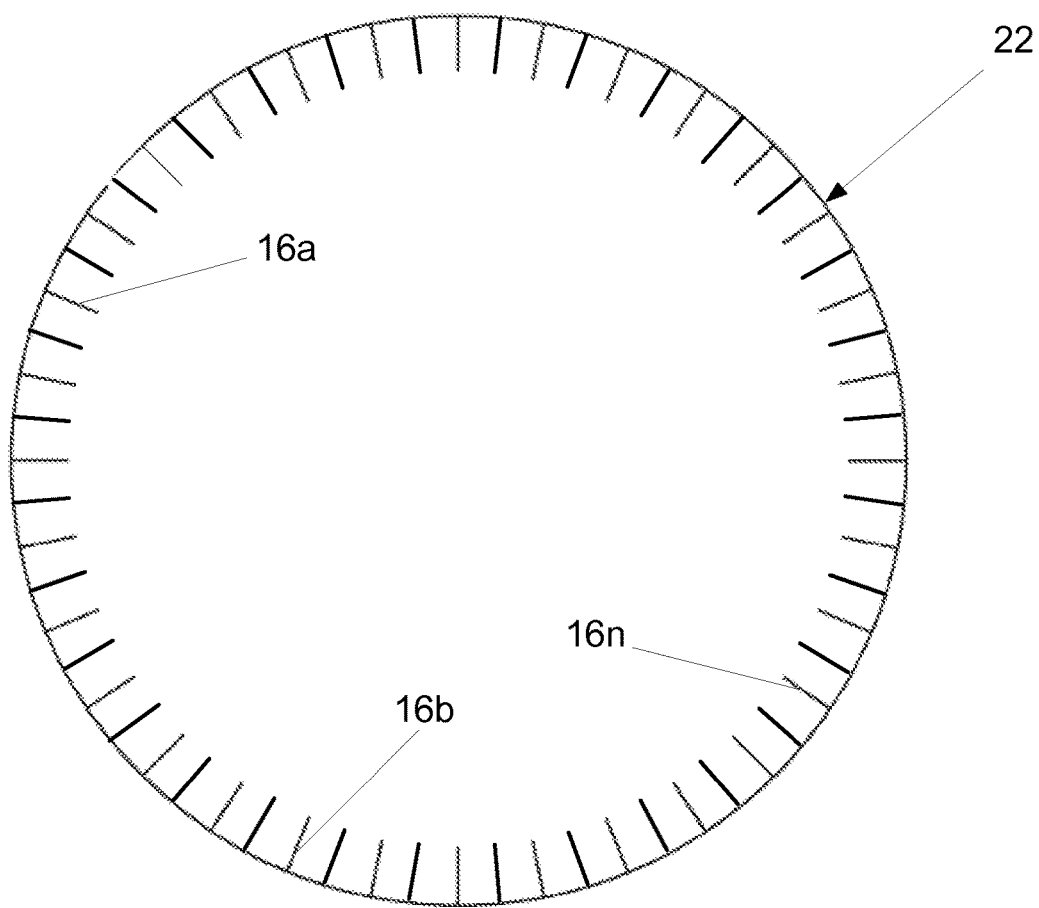
Figure 6C:
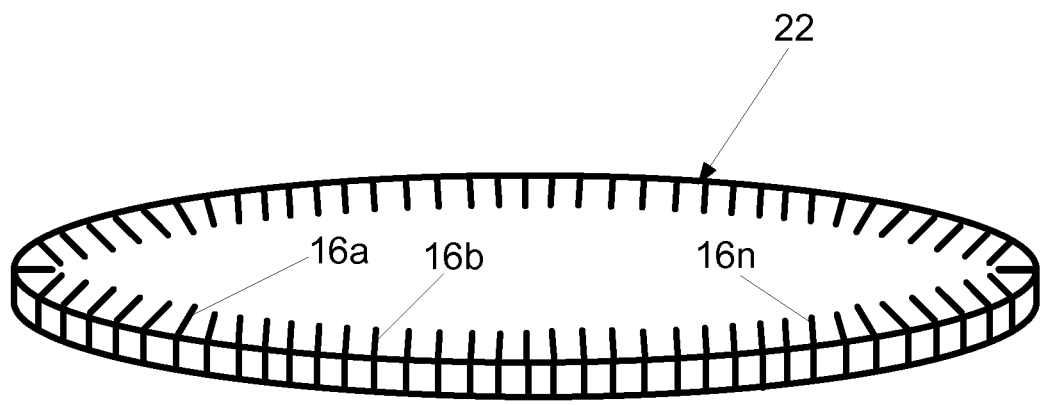
FIG. 6c is a front perspective view thereof, wherein the rear, right, and left side views are symmetrical.

Referring now to FIGS. 6a, 6b and 6c, a further embodiment of a tab 10d consistent with the present disclosure is generally illustrated. The tab 10d may include a plurality of peripheral flaws 16a-16n (only three of peripheral flaws are labeled for clarity) arranged around substantially the entire perimeter 22 of the polymer substrate 12. This embodiment allows for ease of opening the tab 10d without a need for careful alignment of the tab 10d on the unbound edge region 11 of the unenveloped mailing 13.

Figure 7:
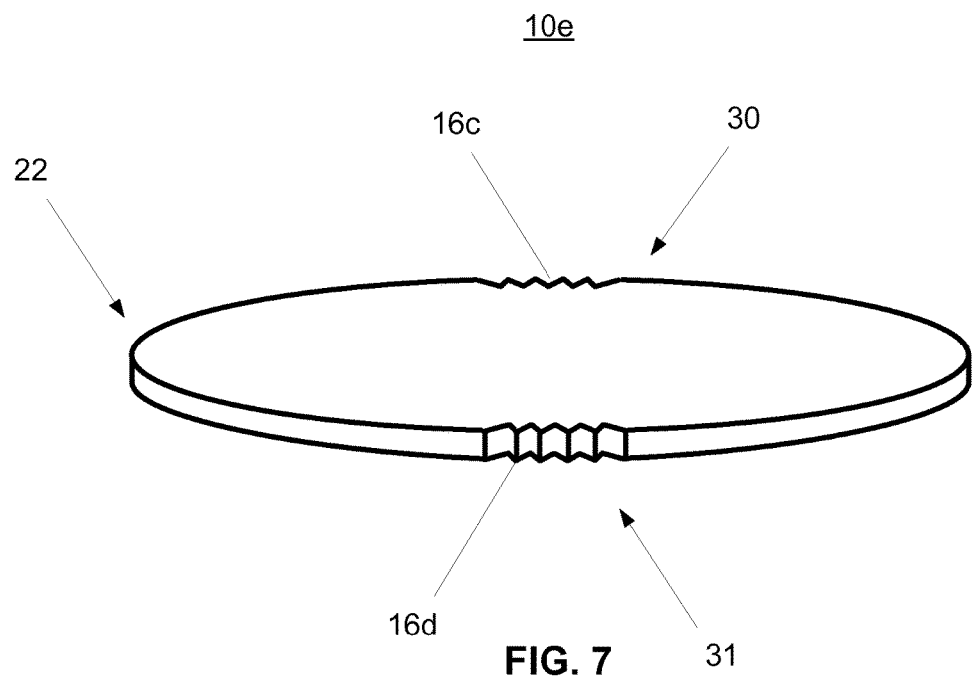
FIG. 7 is a left side perspective view of a fifth embodiment of a tab consistent with the present disclosure, wherein the rear is symmetrical.
Figure 8:
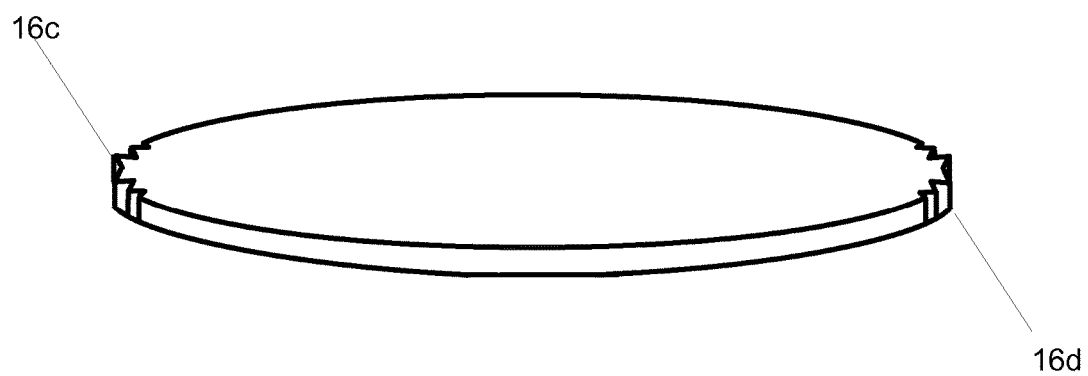
FIG. 8 is a front perspective view thereof wherein the rear is symmetrical.
Figure 9:
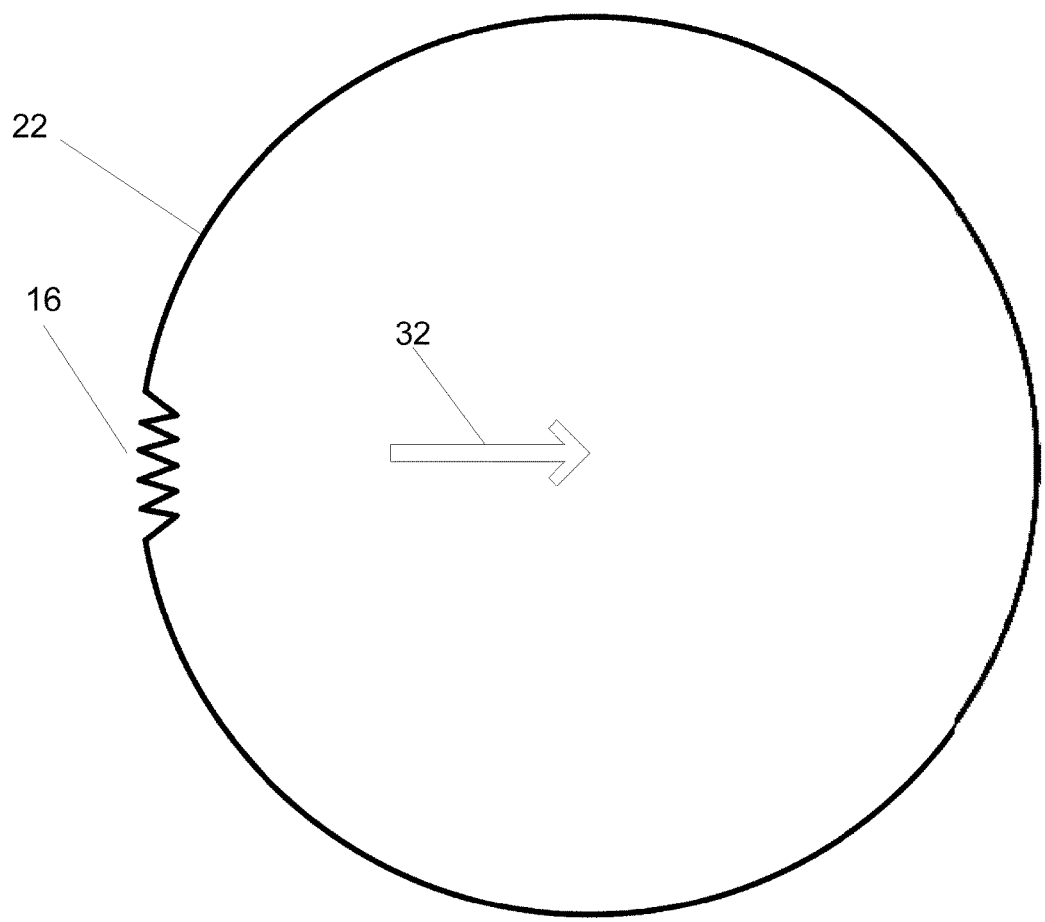
FIG. 9 is a plan view of the top of yet another embodiment of a sealing tab wherein the top and the bottom are symmetrical, and wherein the sealing tab is substantially transparent and substantially planar.
Figure 10:
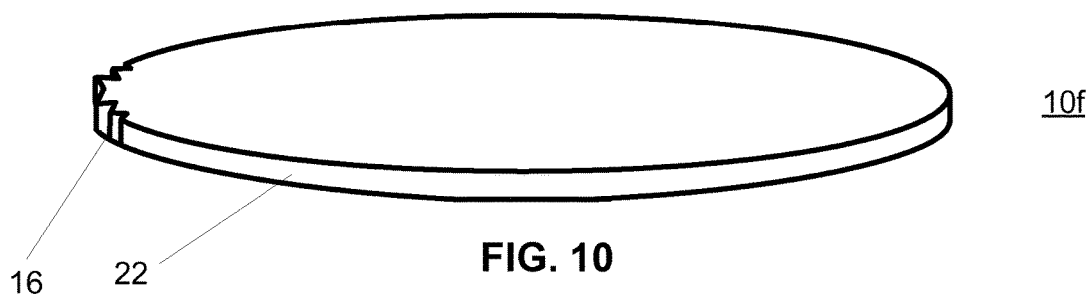
FIG. 10 is a front perspective view thereof.
Figure 11:
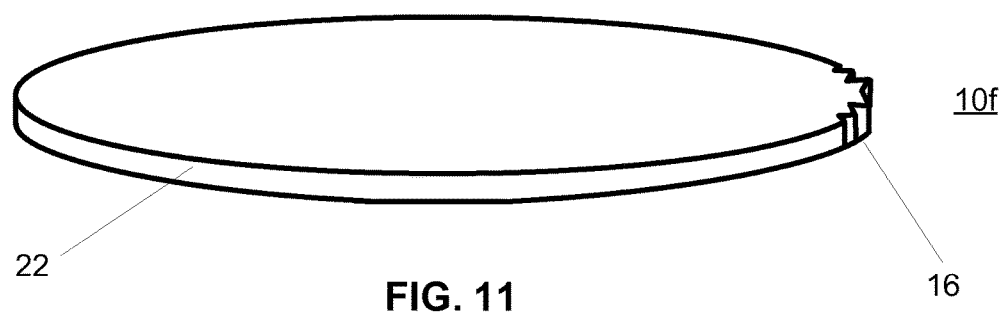
FIG. 11 is a rear perspective view thereof.
Figure 12:
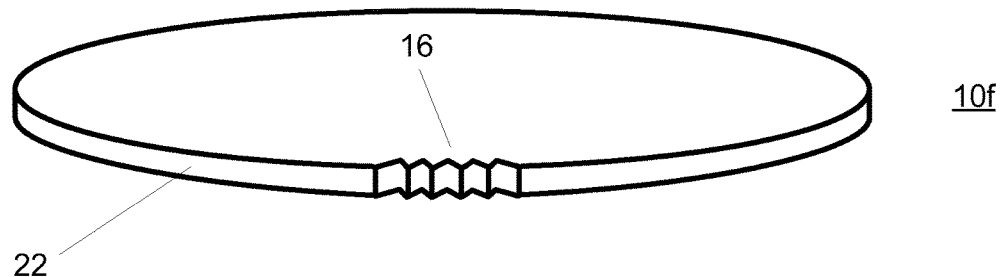
FIG. 12 is a left side perspective view thereof.
Figure 13:
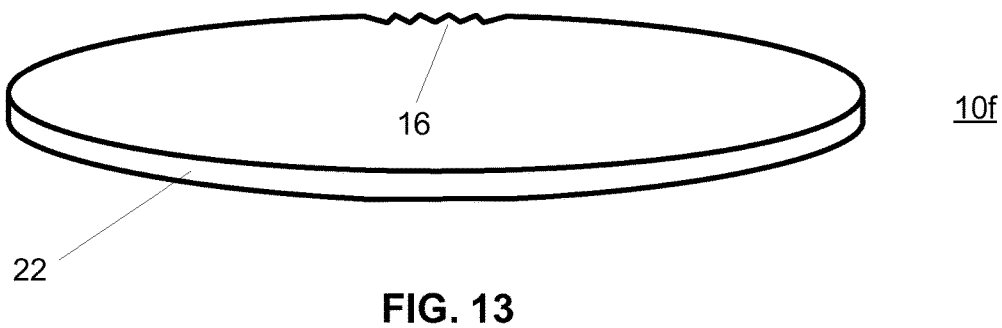
FIG. 13 is a right side perspective view thereof.

Referring to FIGS. 7 and 8, another embodiment of a tab 10e is generally illustrated having opposing peripheral sawtooth flaws 16c, 16d. The opposing peripheral sawtooth flaws 16c, 16d allows for the opening of the tab 10e from either side 30, 31 of the tab 10e. The peripheral sawtooth flaws 16c, 16d may have a depth beginning from the peripheral edge 22 of the tab 10e and extending into the peripheral region 20 (not shown) of approximately 1/32" to 1/16". Such an embodiment would only be able to be easily opened from the location of the peripheral sawtooth flaws 16c, 16d; opening at any other location along the circumference of the tab 10e would be much more difficult. It may also be appreciated that the tab 10e may include a plurality of peripheral sawtooth flaws 16c, 16d, 16n arranged around substantially the entire perimeter 22 of the polymer substrate 12. This embodiment also allows for ease of opening the tab 10e without a need for careful alignment of the tab 10e on the unbound edge region 11 of the unenveloped mailing 13.

Referring now to FIGS. 9-13, yet another embodiment of a tab 10f consistent with the present disclosure is generally illustrated. For example, the tab 10f may include a peripheral sawtooth flaw 16 that extends from a peripheral edge 22 of the polymer substrate 12 across only the peripheral region 20 (not shown) of the cross-section of the tab 10f and not across the inner region 18 (not shown) of the polymer substrate 12. The peripheral sawtooth flaw 16 may be in the shape of any saw pattern known to one of ordinary skill in the art. For example, the peripheral sawtooth flaw 16 may be in a zig zag pattern, etc. The tab 10f may optionally include one or more indicia 32 which indicate the direction that the tab 10f should be torn and/or the location of the peripheral sawtooth flaw 16. The indicia 32 may include, for example, an arrow or the like. The indicia 32 may be visible only in the region of the fold of the tab 10f such that the indicia 32 does not obscure the appearance, content, and style of the unenveloped mailpiece 13.

Figure 14:
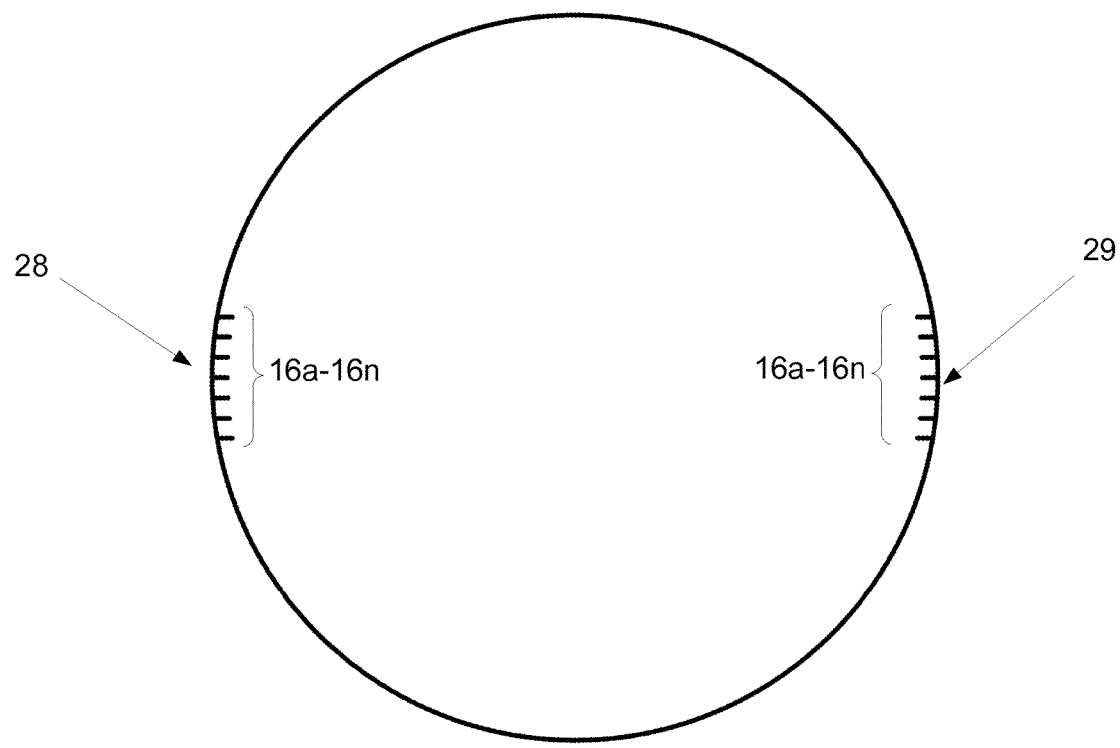
FIG. 14 is a plan view of the top of a further embodiment of a sealing tab wherein the top and the bottom are symmetrical, and wherein the sealing tab is substantially transparent and substantially planar.
Figure 15:
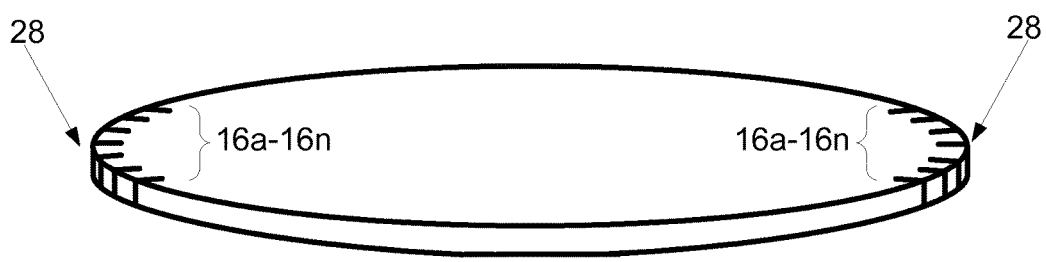
FIG. 15 is a front perspective view thereof wherein the rear is symmetrical.
Figure 16:
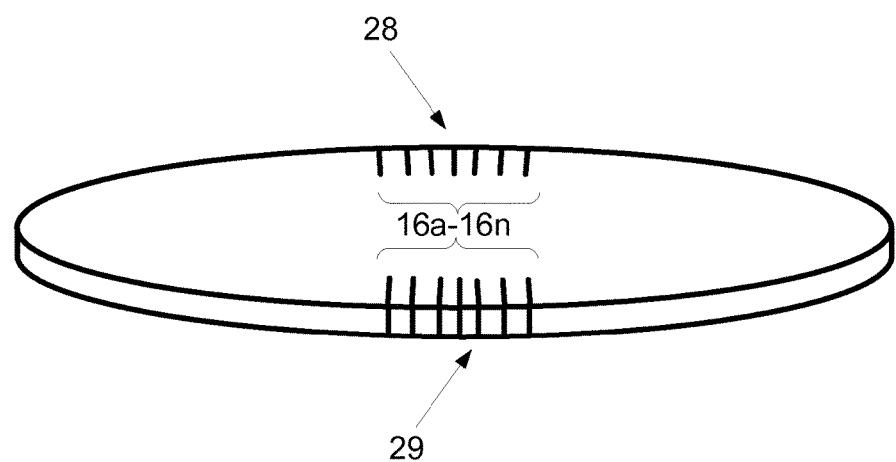
FIG. 16 is a right side perspective view thereof wherein the left side is symmetrical.
Figure 17:
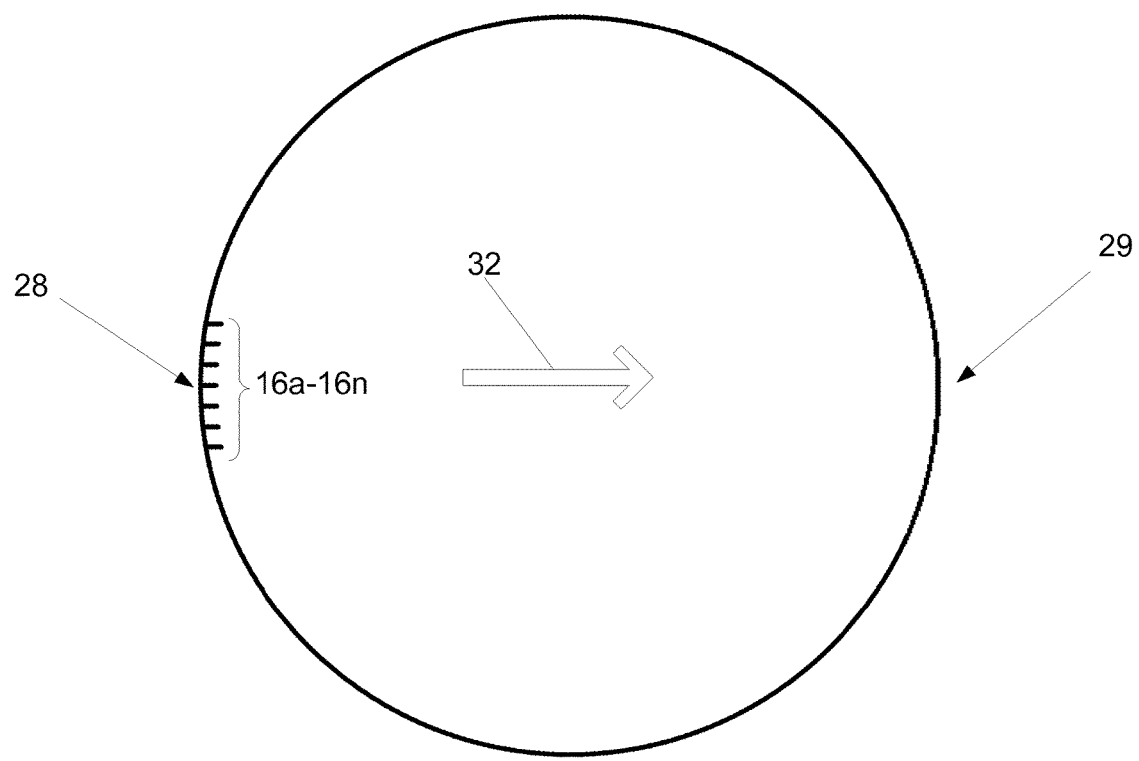
FIG. 17 is a plan view of the top of an additional embodiment of a sealing tab wherein the top and the bottom are symmetrical, and wherein the sealing tab is substantially transparent and substantially planar.
Figure 18:
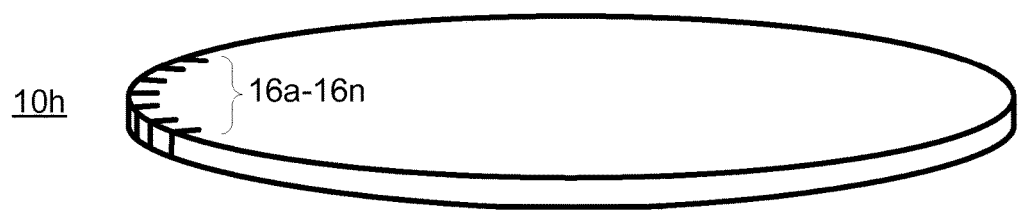
FIG. 18 is a front perspective view thereof.
Figure 19:
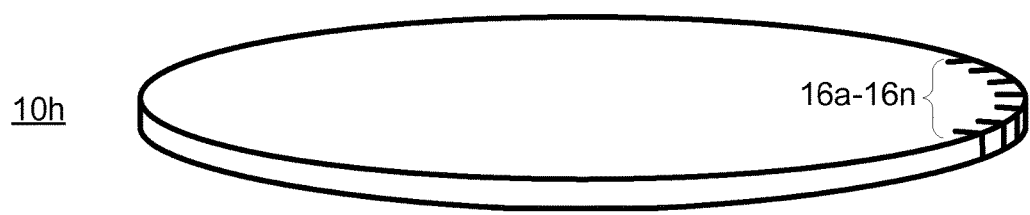
FIG. 19 is a rear perspective view thereof.
Figure 20:
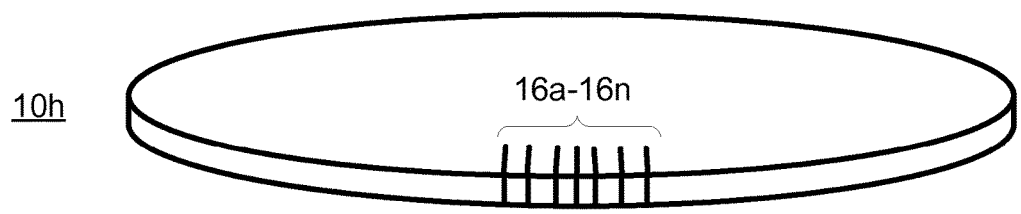
FIG. 20 is a left side perspective view thereof.
Figure 21:
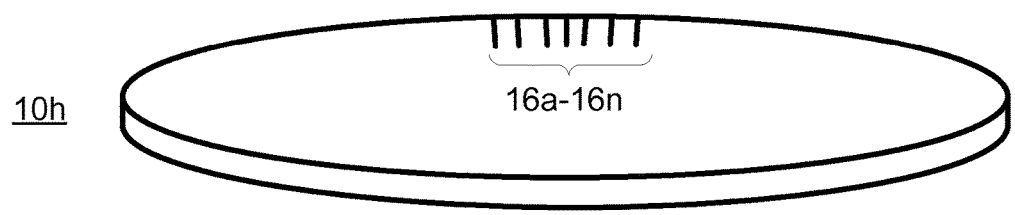
FIG. 21 is a right side perspective view thereof.

With reference to FIGS. 14-16, a further embodiment of a tab 10g consistent with the present disclosure is generally illustrated. The tab 10g includes a plurality of peripheral flaws 16a-16n extending from one or more opposed sides/portions 28, 29 of the tab 10g (e.g., when the tab 10g is folded as generally illustrated in FIG. 1). For example, the tab 10g may include a quantity of 5, 10, 20 or a range of 5-7, 6-8 or 8-10 peripheral flaws 16a-16n on at least one side/portion 28, 29. The plurality of peripheral flaws 16a-16n does not require as accurate a placement of the tab 10g as it is folded over an unbound edge region 11 of the unenveloped mailpiece 13, thereby making the tab 10g more compatible in automated tabbing machinery compared to the a single peripheral flaw or pair of peripheral flaws. The plurality of peripheral flaws 16a-16n may be matched (e.g., location, and spacing of the plurality of peripheral flaws 16a-16n may extend generally in a one-to-one correlation cross lines of the polymer substrate 12) or unmatched.

Turning now to FIGS. 17-21, an additional embodiment of a tab 10h consistent with the present disclosure is generally illustrated. The tab 10h may include a plurality of flaws 16a-16n on at least one side/portion 28, 29 of the tab 10h. Each one of the plurality of peripheral flaws 16a-16n may have a length of approximately 1/32" to 1/16". Such an embodiment would only be able to be easily opened from the general location of the plurality of peripheral flaws 16a-16n; opening at any other location along the circumference of the tab would be much more difficult. The tab 10h may optionally include one or more indicia 32 which indicate the direction that the tab 10h should be torn and/or the location of the plurality of peripheral flaws 16a-16n. The indicia 32 may include, for example, an arrow or the like. The indicia 32 may be visible only in the region of the fold of the tab 10h such that the indicia 32 does not obscure the appearance, content, and style of the unenveloped mailpiece 13.

Figure 22:
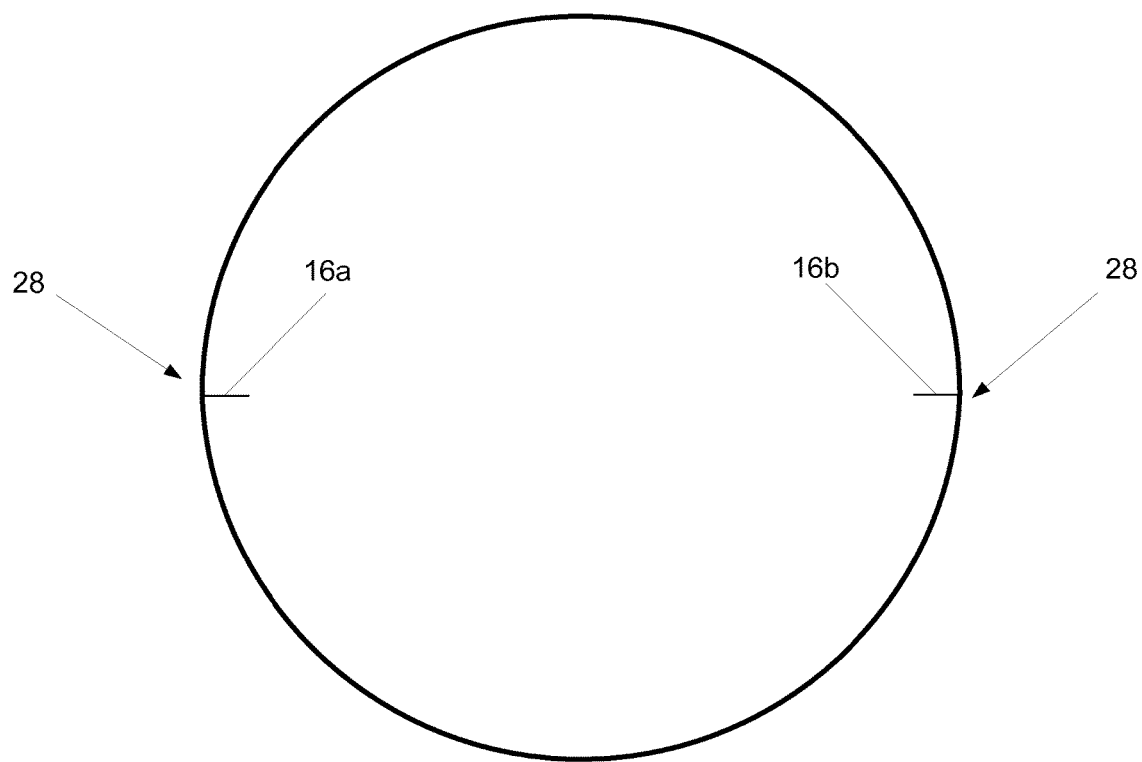
FIG. 22 is a plan view of the top of yet another embodiment of a sealing tab wherein the top and the bottom are symmetrical, and wherein the sealing tab is substantially transparent and substantially planar.
Figure 23:
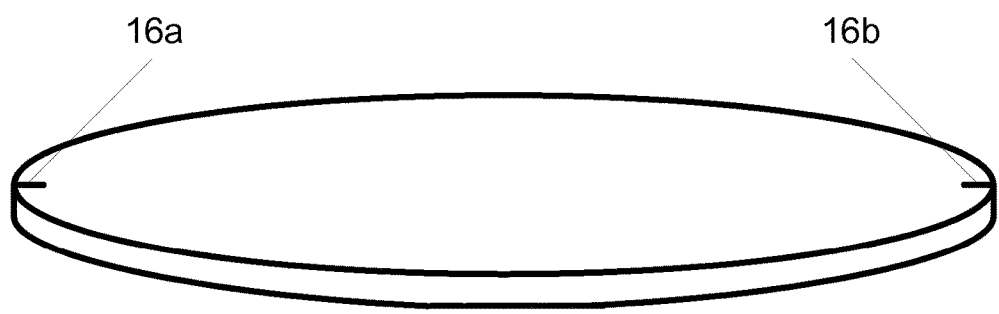
FIG. 23 is a front perspective view thereof wherein the rear is symmetrical.
Figure 24:
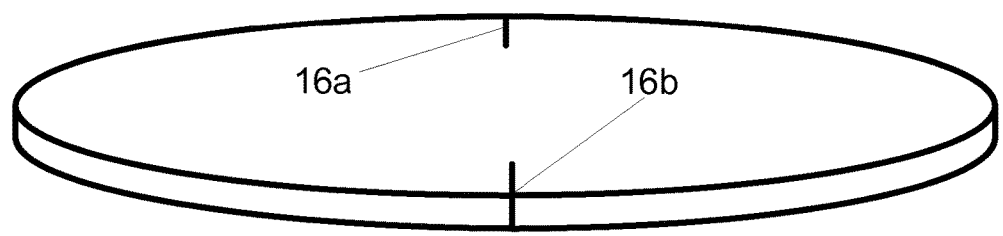
FIG. 24 is a right side perspective view thereof wherein the left side is symmetrical.
Figure 25:
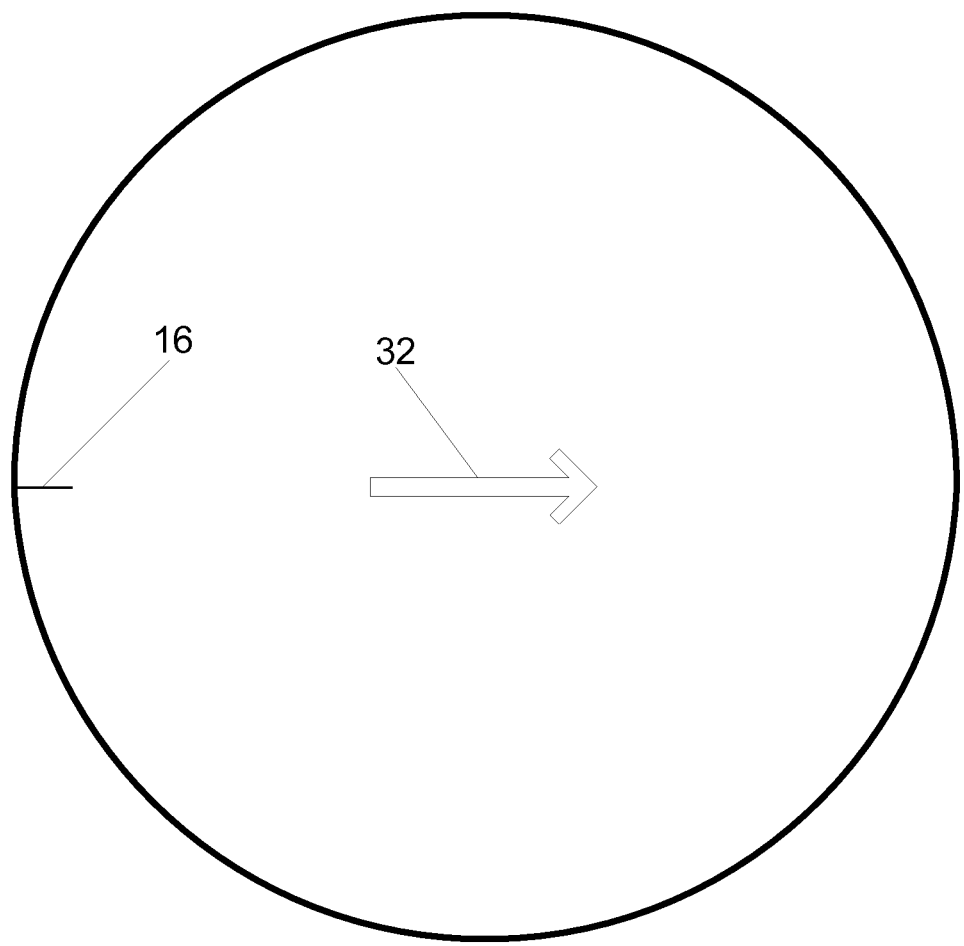
FIG. 25 is a plan view of the top of yet a further embodiment of a sealing tab wherein the top and the bottom are symmetrical, and wherein the sealing tab is substantially transparent and substantially planar.
Figure 26:
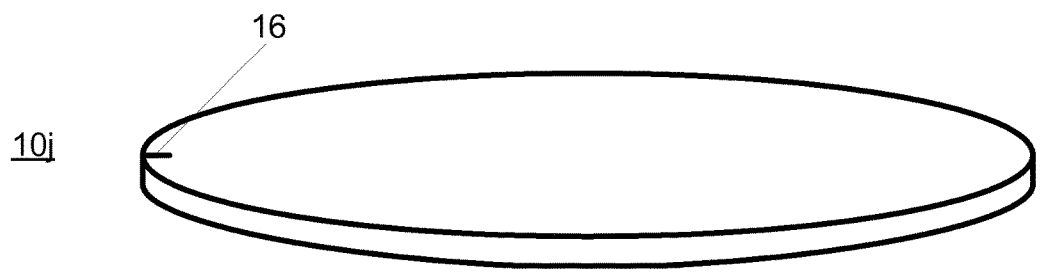
FIG. 26 is a front perspective view thereof.
Figure 27:
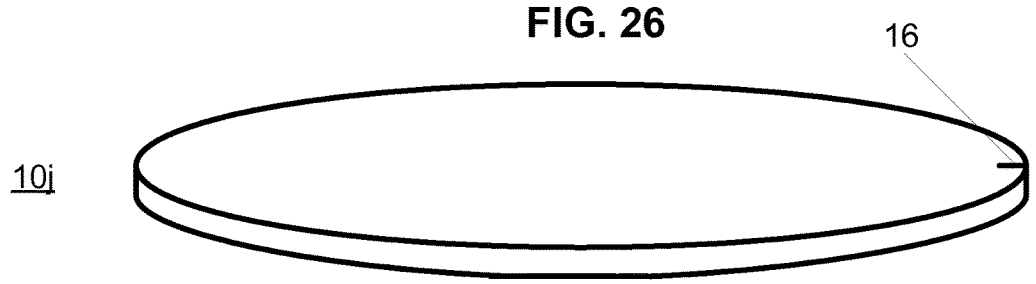
FIG. 27 is a rear perspective view thereof.
Figure 28:
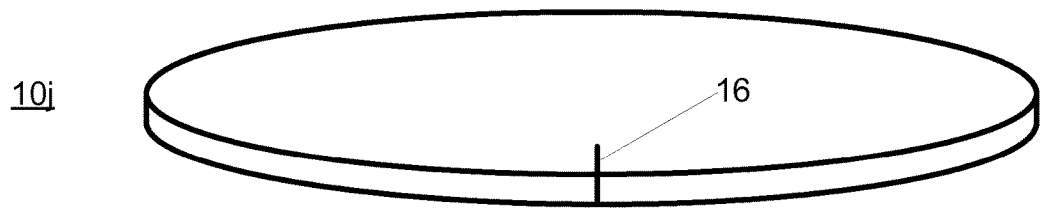
FIG. 28 is a left side perspective view thereof.
Figure 29:
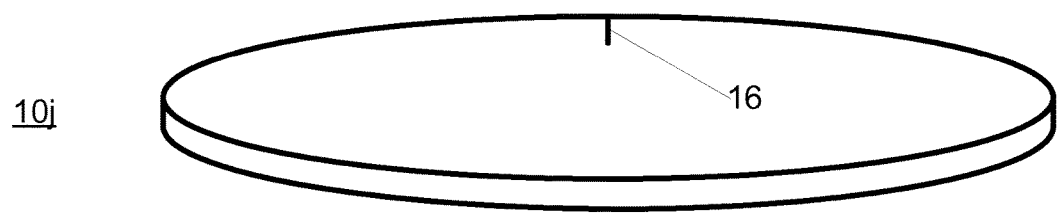
FIG. 29 is a right side perspective view thereof.

With reference to FIGS. 22-24, yet another embodiment of a tab 10i consistent with the present disclosure is generally illustrated. The tab 10i includes at least one peripheral flaw 16a, 16b extending from one or more opposed sides/portions 28, 29 of the tab 10i (e.g., when the tab 10i is folded as general illustrated in FIG. 1). The tab 10i may include a single flaw 16a extending from one or more opposed sides/portions 28, 29 of the tab 10i. The single peripheral flaw 16a, 16b may have a length of approximately 1/32" to 1/16". Such an embodiment would only be able to be easily opened from the location of the single peripheral flaw 16a, 16b; opening at any other location along the circumference of the tab would be much more difficult.

Turning now to FIGS. 25-29, yet a further embodiment of a tab 10j consistent with the present disclosure is generally illustrated. The tab 10j may include a single flaw 16. The single peripheral flaw 16 may have a length of approximately 1/32" to 1/16". Such an embodiment would only be able to be easily opened from the location of the single peripheral flaw 16; opening at any other location along the circumference of the tab would be much more difficult. The tab 10*j* may optionally include one or more indicia 32 which indicate the direction that the tab 10 should be torn and/or the location of the peripheral flaw 16. The indicia 32 may include, for example, an arrow or the like. The indicia 32 may be visible only in the region of the fold of the tab 10*j* such that the indicia 32 does not obscure the appearance, content, and style of the unenveloped mailpiece 13.

Figure 30:
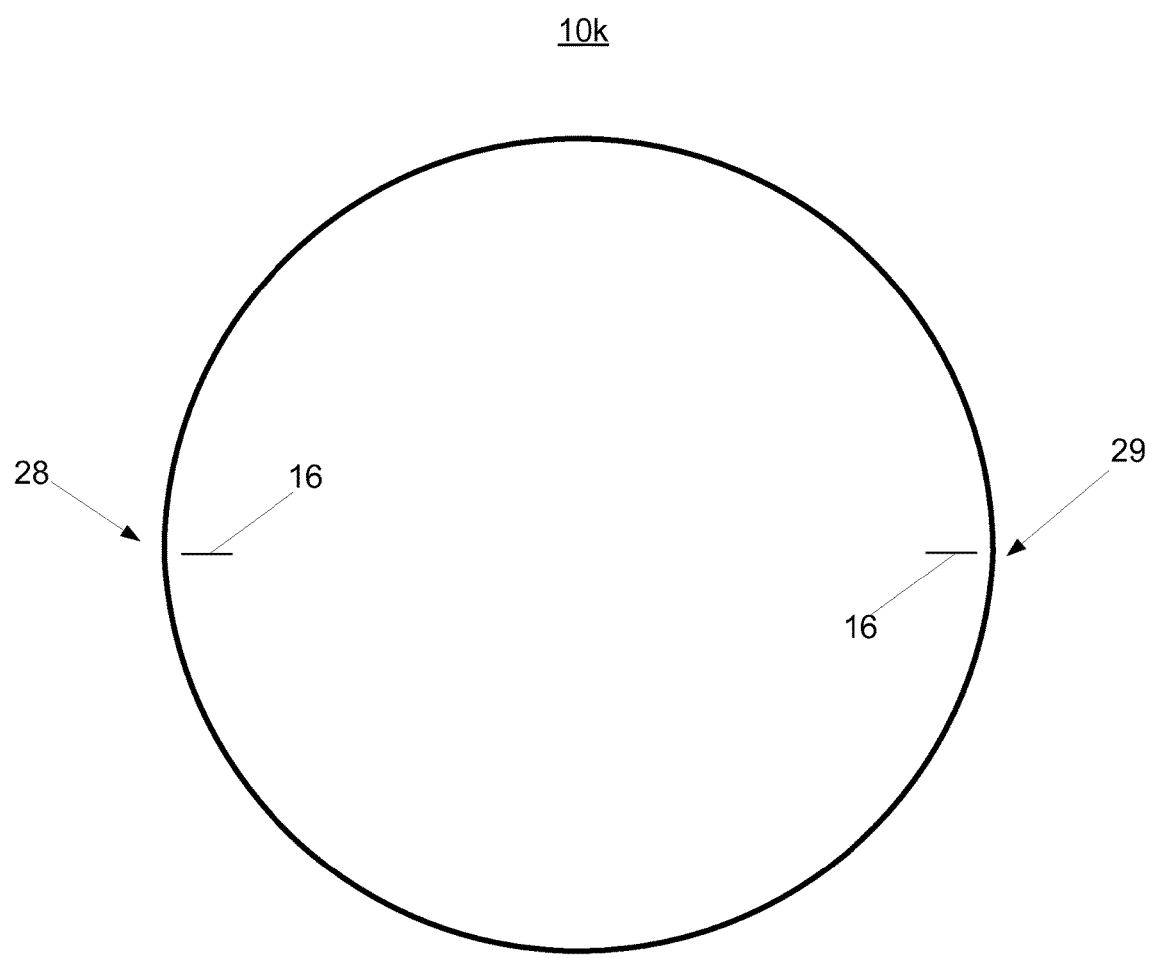
FIG. 30 is a plan view of the top of another embodiment of a sealing tab wherein the top and the bottom are symmetrical, and wherein the sealing tab is substantially transparent and substantially planar.
Figure 31:
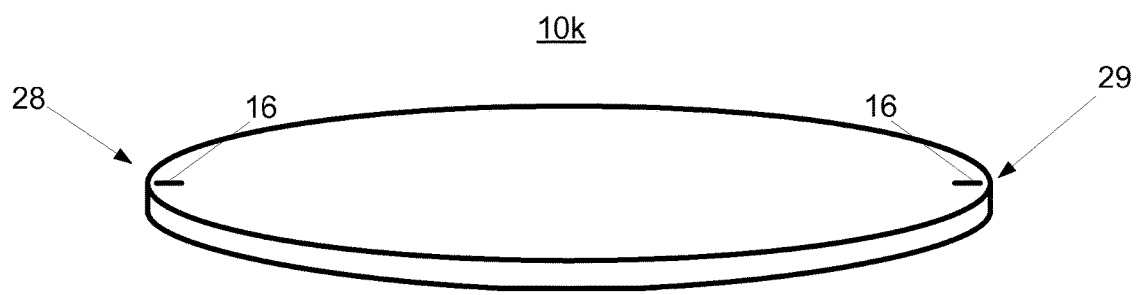
FIG. 31 is a front perspective view thereof wherein the rear is symmetrical.
Figure 32:
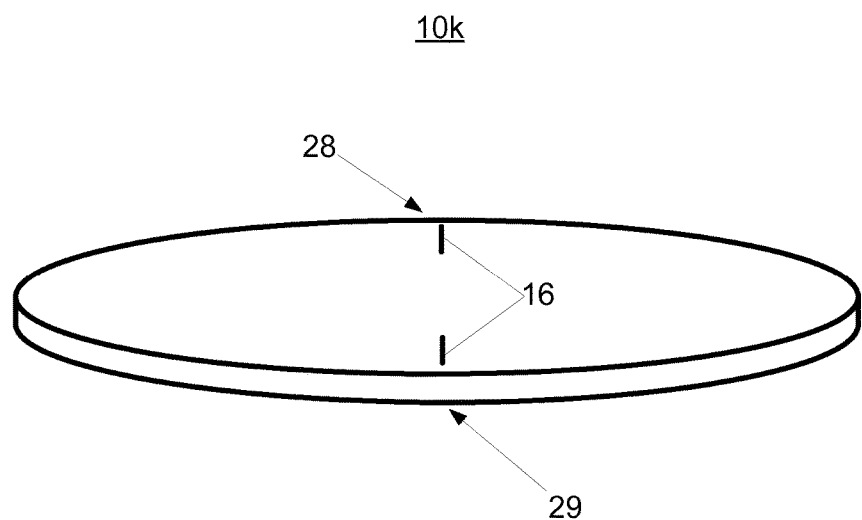
FIG. 32 is a right side perspective view thereof wherein the left side is symmetrical.
Figure 33:
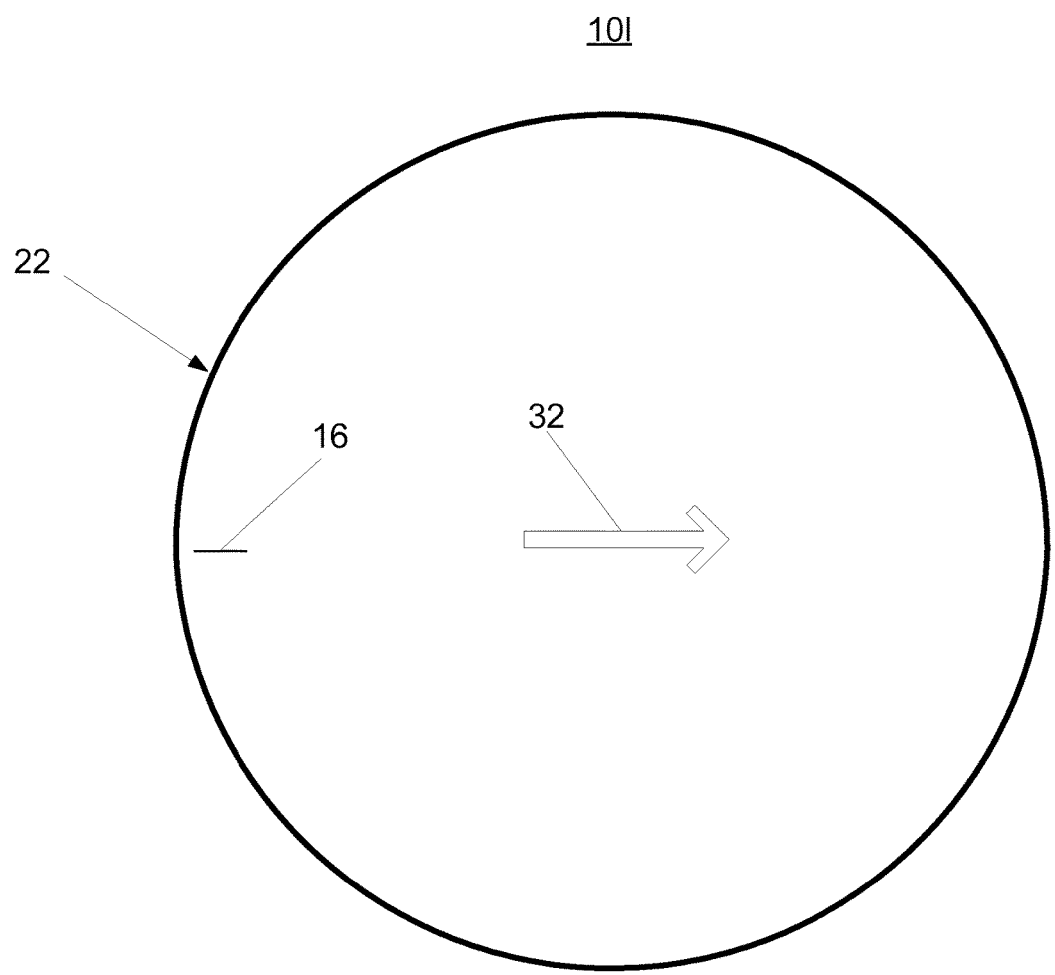
FIG. 33 is a plan view of the top of yet another embodiment of a sealing tab wherein the top and the bottom are symmetrical, and wherein the sealing tab is substantially transparent and substantially planar.
Figure 34:
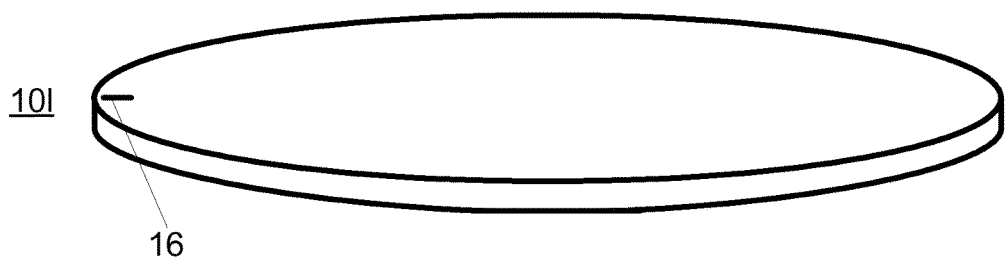
FIG. 34 is a front perspective view thereof.
Figure 35:
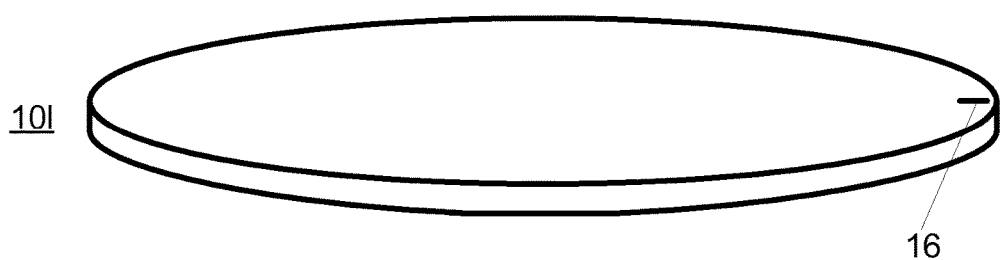
FIG. 35 is a rear perspective view thereof.
Figure 36:
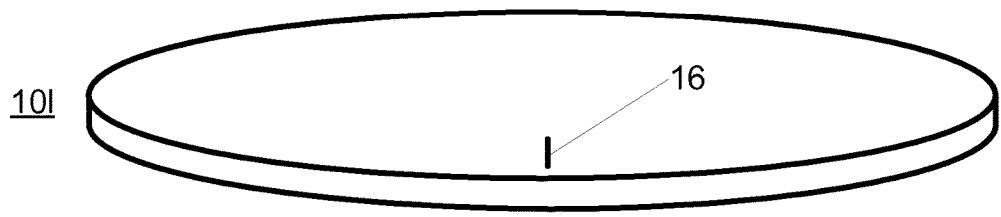
FIG. 36 is a left side perspective view thereof.
Figure 37:
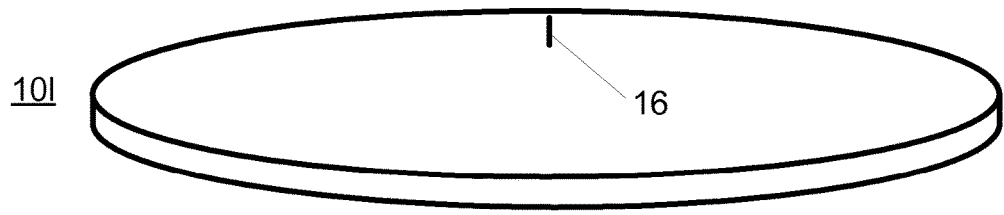
FIG. 37 is a right side perspective view thereof.

With reference to FIGS. 30-32, another embodiment of a tab 10*k* consistent with the present disclosure is generally illustrated. The tab 10*k* may include at least one peripheral flaw 16 on at least one side/portion 28, 29 of the tab 10*k*, wherein the peripheral flaw 16 is offset from the peripheral edge 22, but still substantially within the peripheral region 20 (as discussed above and illustrated in FIG. 2) of the tab 10*k*. The at least one peripheral flaw 16 may have a length of approximately ⅓₂" to ¹⁄₁₆". Such an embodiment would only be able to be easily opened from the general location of the at least one peripheral flaw 16 or other peripheral flaws; opening at any other location along the circumference of the tab would be much more difficult.

Turning now to FIGS. 33-37, yet another embodiment of a tab 10*l* consistent with the present disclosure is generally illustrated. The tab 10*l* may include a single flaw 16 that is offset from the peripheral edge 22, but still substantially within the peripheral region 20 of the tab 10*l*. The single peripheral flaw 16 may have a length of approximately ⅓₂" to ¹⁄₁₆". Such an embodiment would only be able to be easily opened from the location of the single peripheral flaw 16; opening at any other location along the circumference of the tab would be much more difficult. The tab 10*l* may optionally include one or more indicia 32 which indicate the direction that the tab 10 should be torn and/or the location of the peripheral flaw 16. The indicia 32 may include, for example, an arrow or the like. The indicia 32 may be visible only in the region of the fold of the tab 10*l* such that the indicia 32 does not obscure the appearance, content, and style of the unenveloped mailpiece 13.

Figure 38:
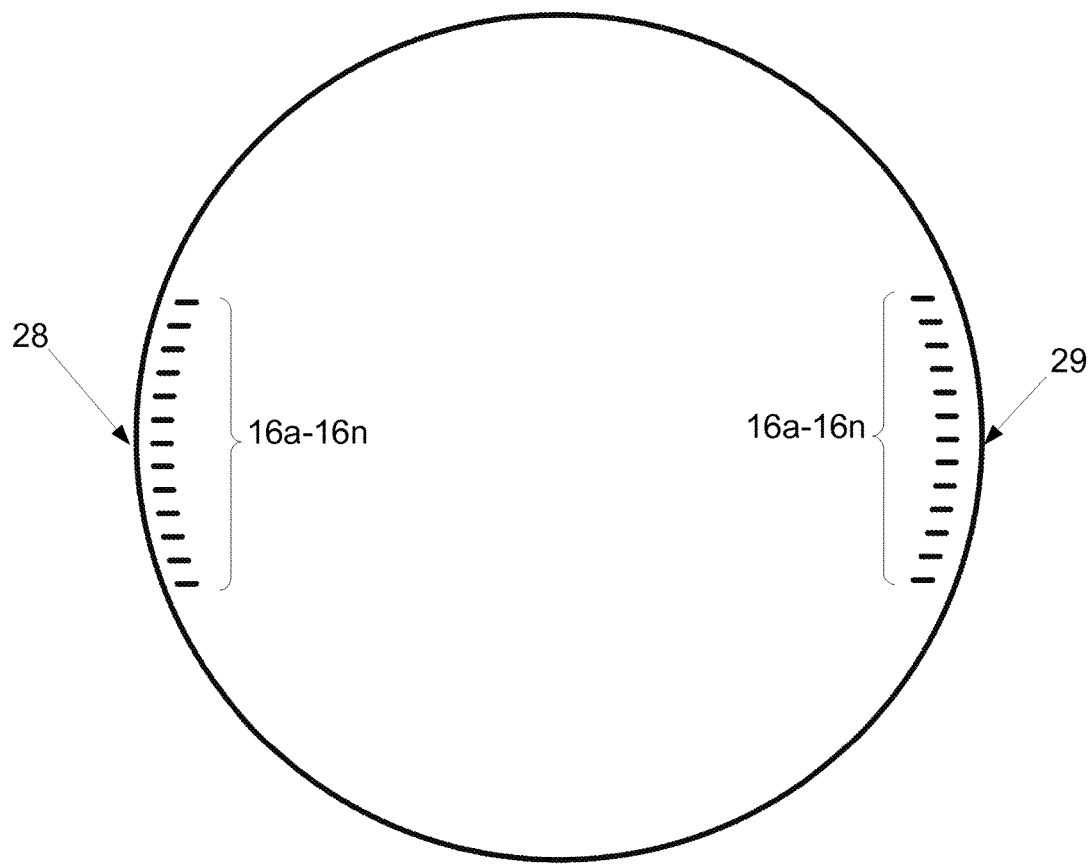
FIG. 38 is a plan view of the top of an additional embodiment of a sealing tab wherein the top and the bottom are symmetrical, and wherein the sealing tab is substantially transparent and substantially planar.
Figure 39:
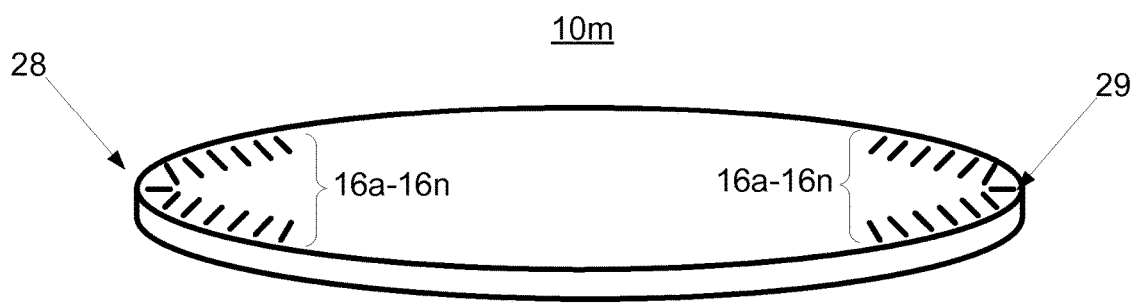
FIG. 39 is a front perspective view thereof wherein the rear is symmetrical.
Figure 40:
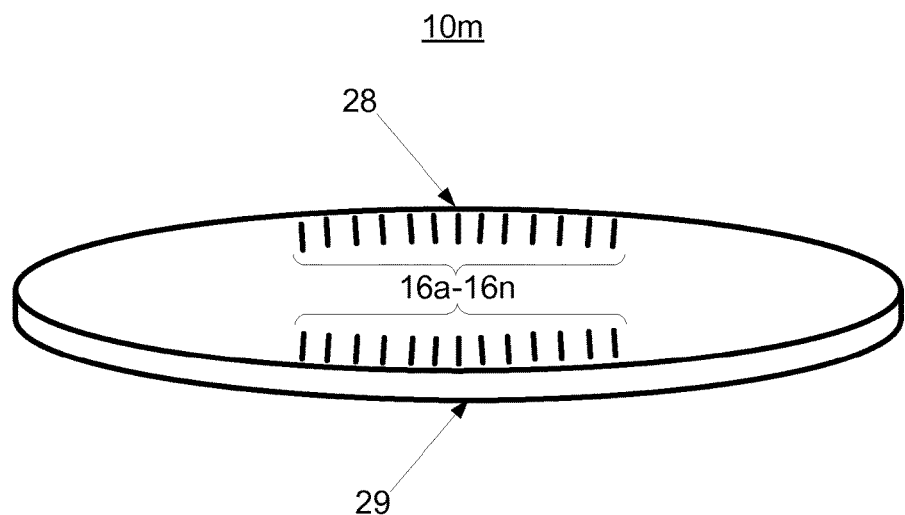
FIG. 40 is a right side perspective view thereof wherein the left side is symmetrical.
Figure 41:
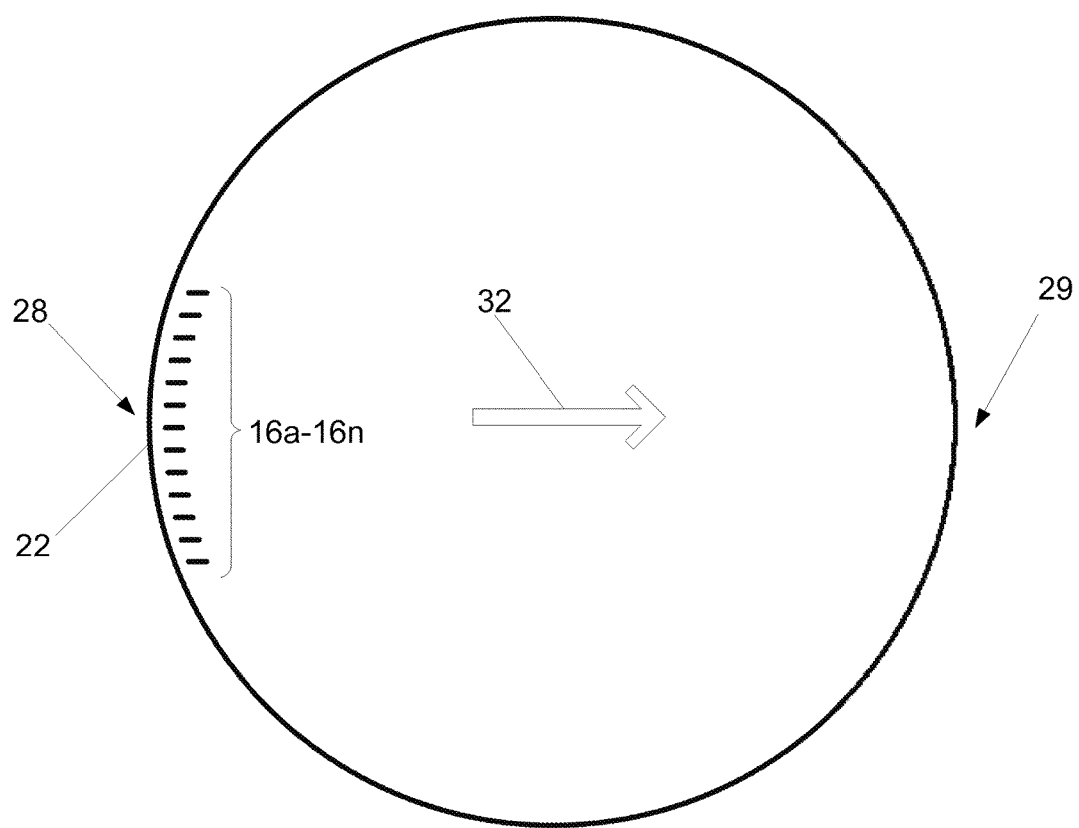
FIG. 41 is a plan view of the top of yet another embodiment of a sealing tab wherein the top and the bottom are symmetrical, and wherein the sealing tab is substantially transparent and substantially planar.
Figure 42:
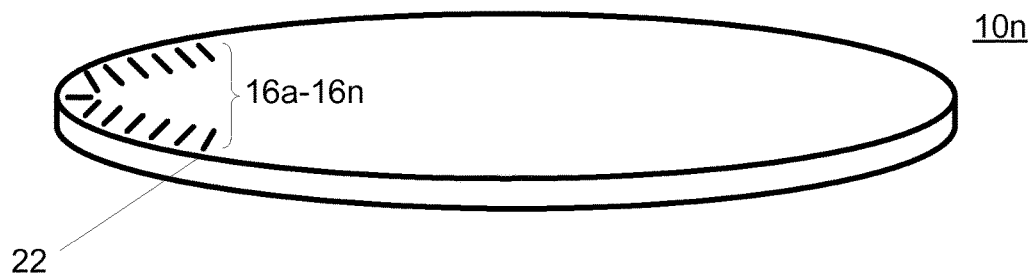
FIG. 42 is a front perspective view thereof.
Figure 43:
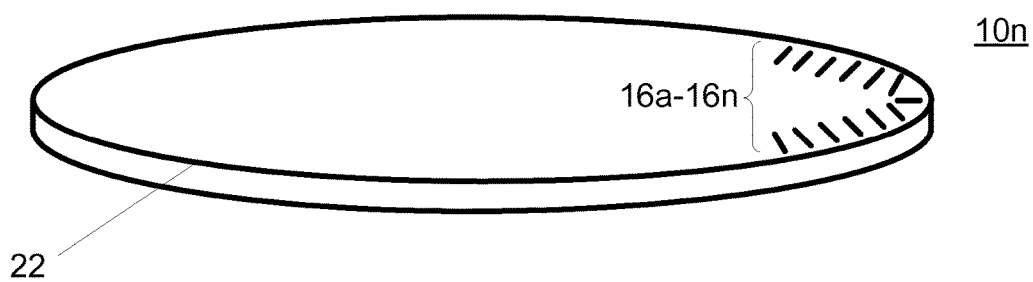
FIG. 43 is a rear perspective view thereof.
Figure 44:
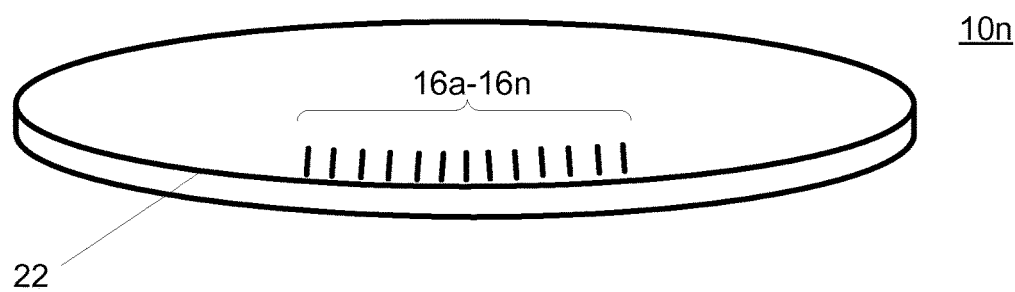
FIG. 44 is a left side perspective view thereof.
Figure 45:
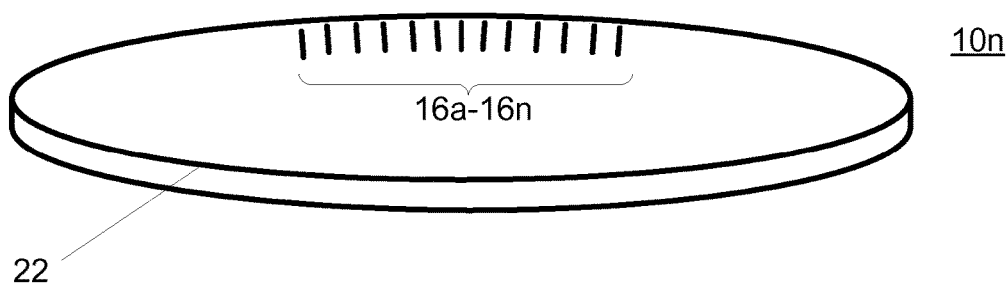
FIG. 45 is a right side perspective view thereof.

With reference to FIGS. 38-40, an additional embodiment of a tab 10*m* consistent with the present disclosure is generally illustrated. The tab 10*m* includes a plurality of peripheral flaws 16*a*-16*n* extending from one or more opposed sides/portions 28, 29 of the tab 10*m* (e.g., when the tab 10*m* is folded as generally illustrated in FIG. 1), wherein the plurality of peripheral flaws 16*a*-16*n* are offset from the peripheral edge 22, but still substantially within the peripheral region 20 (as discussed above and illustrated in FIG. 2) of the tab 10*m*. The plurality of peripheral flaws 16*a*-16*n* does not require as accurate a placement of the tab 10*m* as it is folded over an unbound edge region 11 of the unenveloped mailpiece 13, thereby making the tab 10*m* more compatible in automated tabbing machinery compared to the a single peripheral flaw or pair of peripheral flaws. The plurality of peripheral flaws 16*a*-16*n* may be matched (e.g., location, and spacing of the plurality of peripheral flaws 16*a*-16*n* may extend generally in a one-to-one correlation cross lines of the polymer substrate 12) or unmatched.

Turning now to FIGS. 41-45, yet another embodiment of a tab 10*n* consistent with the present disclosure is generally illustrated. The tab 10*n* may include a plurality of flaws 16*a*-16*n* on at least one side/portion 28, 29 of the tab 10*n*, wherein the plurality of peripheral flaws 16*a*-16*n* are offset from the peripheral edge 22, but still substantially within the peripheral region 20 (as discussed above and illustrated in FIG. 2) of the tab 10*m*.

Each one of the plurality of peripheral flaws 16*a*-16*n* may have a length of approximately ⅓₂" to ¹⁄₁₆". Such an embodiment would only be able to be easily opened from the general location of the plurality of peripheral flaws 16*a*-16*n*; opening at any other location along the circumference of the tab would be much more difficult. The tab 10*n* may optionally include one or more indicia 32 which indicate the direction that the tab 10*n* should be torn and/or the location of the plurality of peripheral flaws 16*a*-16*n*. The indicia 32 may include, for example, an arrow or the like. The indicia 32 may be visible only in the region of the fold of the tab 10*h* such that the indicia 32 does not obscure the appearance, content, and style of the unenveloped mailpiece 13.

According to one aspect, the present disclosure features a tab for sealing unbound edges of a mailpiece. The tab includes a flexible film having a periphery region and a substantially continuous inner region, at least one adhesive layer disposed about at least a portion of a bottom surface of the flexible film, and at least one peripheral flaw disposed within the periphery region.

According to another aspect, the present disclosure features a tab for sealing unbound edges of a mailpiece. The tab includes a flexible film, at least one adhesive layer disposed about at least a portion of a bottom surface of the flexible film, and at least one peripheral flaw disposed within a periphery region of the flexible film. The flexible film also includes a substantially continuous inner region that is not perforated.

According to yet another aspect, the present disclosure features a system including an unenveloped mailpiece and a tab. The unenveloped mailpiece includes a front surface, a rear surface, and at least one unbounded edge separating the front and rear surfaces. The tab includes a flexible film, at least one adhesive layer, and at least one peripheral flaw. The flexible film is configured to extend from the front surface across the unbounded edge to the rear surface and includes a periphery region and a substantially continuous inner region. The at least one adhesive layer is disposed about at least a portion of a bottom surface of the flexible film configured to adhere to the front and the rear surfaces. The at least one peripheral flaw is disposed within the periphery region and generally aligned with unbounded edge.

While the principles of the present disclosure have been described herein, it is to be understood by those skilled in the art that this description is made only by way of example and not as a limitation as to the scope of the invention. The features and aspects described with reference to particular embodiments disclosed herein are susceptible to combination and/or application with various other embodiments described herein. Such combinations and/or applications of such described features and aspects to such other embodiments are contemplated herein. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

All references, patents and patent applications and publications that are cited or referred to in this application are incorporated in their entirety herein by reference.

Additional disclosure in the format of claims is set forth below:

What is claimed is:

1. A tab for sealing unbound edges of a mailpiece, said tab comprising:
    a flexible film having a periphery region surrounding a substantially continuous inner region, wherein said flexible film is a substantially transparent polymer-based film and wherein said periphery region extends along an entire periphery of said flexible film to less than, or equal to, 10% of the longest cross-sectional dimension of the flexible film;
    at least one adhesive layer disposed about at least a portion of a bottom surface of said flexible film;
    a first set of a plurality of adjacent parallel peripheral flaws disposed within said periphery region of a first side of said flexible film; and
    a second set of a plurality of adjacent parallel peripheral flaws disposed within said periphery region of a second side of said flexible film, said second side generally opposing said first side; and
    wherein said peripheral flaws of said first and said second set are configured to introduce a weakness into said flexible film to facilitate tearing said tab into two pieces and are disposed only in said first and said second sides, respectively.

2. The tab of claim 1, wherein said periphery region extends from a periphery of said flexible film to less than, or equal to, 5% of the longest cross-sectional dimension of the flexible film.

3. The tab of claim 1, wherein said flexible film includes at least one polymer selected from the group consisting of polyethylene terephthalate, polypropylene, polystyrene, polyethylene, polyester, and triacetate.

4. A system comprising:
    a tab for sealing an unbound edge of a mailpiece, said tab comprising:
        a flexible film comprising a substantially transparent polymer substrate having a first and a second generally opposing side;
        at least one adhesive layer disposed about at least a portion of a bottom surface of said flexible film;
        a first set of a plurality of adjacent parallel peripheral flaws disposed within said first side of a periphery region of said flexible film, said plurality of adjacent parallel peripheral flaws of said first set each extending along a plurality of axes; and
        a second set of a plurality of adjacent parallel peripheral flaws disposed within said second side of the periphery region of said flexible film, said plurality of adjacent parallel peripheral flaws of said second set each extending along a plurality of axes generally aligned with said plurality of axes of said plurality of peripheral flaws of said first set;
        wherein said plurality of adjacent parallel flaws are configured to introduce a weakness into said flexible film extending between said first and said second sides to facilitate tearing said tab into two pieces;
        wherein all peripheral flaws in said periphery region extend continuously from said periphery and are disposed only in said first and said second sides, respectively;
        wherein said periphery region extends along an entire periphery of said flexible film to less than, or equal to, 10% of the longest cross-sectional dimension of the flexible film and surrounds a substantially continuous inner region of said flexible film; and
        wherein said substantially continuous inner region of said flexible film is not perforated.

5. The system of claim 4, further comprising said mailpiece, said mailpiece including a front surface, a rear surface, and said unbounded edge separating said front and rear surfaces, wherein said tab includes a first and a second secured region which are adhered to said front and said rear surface of said mailpiece, respectively, and a folded region extending therebetween and across said unbounded edge.

6. The system of claim 5, wherein said folded region extends through said first and said second sides of said tab.

7. The tab of claim 1, wherein said tab comprises a folded region configured to fold over at least a portion of said unbounded edge, wherein said first set and said second set of a plurality of adjacent parallel peripheral flaws are disposed in said folded region.

8. The system of claim 1, wherein said first set and said second set of a plurality of adjacent peripheral flaws extend generally parallel to a folding axis about which said folded region folds over said unbounded edge.

9. The system of claim 1, wherein all peripheral flaws in said periphery region extend continuously from said periphery.

10. A system comprising:
    an unenveloped mailpiece comprising a front surface, a rear surface, and an unbounded edge separating said front and rear surfaces; and
    a tab comprising:
        a flexible film having a periphery region surrounding a substantially continuous inner region, wherein said flexible film is a substantially transparent polymer-based film and wherein said periphery region extends along an entire periphery of said flexible film to less than, or equal to, 10% of the longest cross-sectional dimension of the flexible film, wherein said tab comprises a first and a second secured region configured to be adhered to said front and said rear surface of said unenveloped mailpiece, respectively, and a folded region extending across said unbounded edge and between said first and said second secured region;
        at least one adhesive layer disposed about at least a portion of a bottom surface of said first and said second secured region of said flexible film;
        a first set of a plurality of adjacent parallel peripheral flaws disposed within said periphery region of a first side of said folded region; and
        a second set of a plurality of adjacent parallel peripheral flaws disposed within said periphery region of a second side folded region, said second side generally opposing said first side;
        wherein said peripheral flaws of said first and said second are configured to introduce a weakness into said flexible film to facilitate tearing said tab into two pieces within said folded region; and wherein said first set and said second set of a plurality of adjacent peripheral flaws are separated by a first and a second portion of said periphery region and are disposed only in said first and said second sides, respectively.

11. The system of claim 10, wherein all peripheral flaws in said periphery region extend continuously from said periphery.

12. The system of claim 10, wherein said first set and said second set of a plurality of adjacent peripheral flaws are configured to extend generally parallel with said unbounded edge.

13. The system of claim 10, wherein said periphery region extends from said periphery of said flexible film to less than, or equal to, 5% of the longest cross-sectional dimension of the flexible film.

14. The system of claim 10, wherein said flexible film includes at least one polymer selected from the group consisting of polyethylene terephthalate, polypropylene, polystyrene, polyethylene, polyester, and triacetate.

15. The system of claim 10, wherein said first set and said second set of a plurality of adjacent peripheral flaws extend generally parallel to a folding axis about which said folded region is configured to fold over said unbounded edge.

16. The system of claim 10, wherein said flexible film comprises polypropylene or polystyrene having a thickness of 1.5 to 2 mil.

17. The system of claim 16, wherein said plurality of adjacent peripheral flaws of said first set and said second set have a length of approximately 1/64 inch to 1/8 inch.

18. The system of claim 10, wherein said tab is substantially transparent.

* * * * *